(12) United States Patent
Jacobs

(10) Patent No.: US 6,532,400 B1
(45) Date of Patent: Mar. 11, 2003

(54) BIOLOGICALLY-INSPIRED MULTI-SEGMENTED ROBOT

(75) Inventor: Ronny Jacobs, Sunnyvale, CA (US)

(73) Assignee: Intelligent Inference Systems Corporation, Sunnyvale, CA (US)

(*) Notice: Subject to any disclaimer, the term of this patent is extended or adjusted under 35 U.S.C. 154(b) by 0 days.

(21) Appl. No.: 09/533,811

(22) Filed: Mar. 24, 2000

(51) Int. Cl.$^7$ ............................................... G06F 19/00
(52) U.S. Cl. ........................ 700/245; 700/253; 701/23; 901/34; 318/568.11; 318/568.12; 318/568.17
(58) Field of Search ................................. 700/245, 253; 701/23; 318/568.11, 568.12, 568.17; 702/150; 180/8.6; 310/10, 17, 22, 135, 309; 254/264; 212/273; 901/34

(56) References Cited

PUBLICATIONS

Grodski et al., Robotic muscle–like actuator, 2000, Internet, pp. 1–61.*
Alleyne, A high–efficiency approach to mobile electrohydraulics for human exoskeletings, Mar.1–3, 2000, pp. 1–11.*
OE Reports 177, Low–mass muscle actuators act almost like the real thing, 1998, Internet, pp. 1–.*
Bar–Cohen et al., Low–mass muscle actuators using electroactive plymers (EAP), 1998, Internet, pp. 1–6.*
Glenn, Current research activities include: Artificial muscles: Actuators for biorobotics system, 1999, Internet, pp. 1–3.*
McKibben, Braided pneumatic actuator test stand, 2001, Internet, pp. 1–3.*
Glen, McKibben artificial muscles, 1999, Internet, pp. 1–2.*
Klute et al., Powering lower limb prosthetics with muscle–like actuators, no date, Internet, p. 1.*

* cited by examiner

Primary Examiner—William A. Cuchlinski, Jr.
Assistant Examiner—McDieunel Marc
(74) Attorney, Agent, or Firm—Burns, Doane Swecker & Mathis LLP

(57) ABSTRACT

A biologically inspired, multi-segmented robot is provided, wherein the biologically inspired, multi-segmented robot employs a logic-based technique to control mobility, rather than a mobility control technique that relies on complex mathematical models. The robot is biologically-inspired in that it employs certain artificial, anatomical and neurophysiological features that are similar to features found in actual biological systems, including a host of artificial joints and muscle-like actuators. These anatomical and neurophysiological features exhibit certain built-in, mechanical constraints, which provide mechanical feedback that is similar to the type of feedback that is inherent in genuine biological systems. In addition, the robot employs one or more sensors which are capable of measuring the status (e.g., the position) of the robot. A controller then uses the sensor data to activate functional groupings of the muscle-like activators to control mobility.

54 Claims, 16 Drawing Sheets

$C = C1 + C2$

| "OFF" | MUSCLE 1 = "ON" (BLACK) | MUSCLE 2 = "ON" (GREY) |
| (NO ACTIVATION) | (100% OF MAXIMAL FORCE) | (100% OF MAXIMAL FORCE) |

| "OFF" | "1/2 ON" | "ON" |
| (NO ACTIVATION) | (50% OF MAXIMAL FORCE) | (100% OF MAXIMAL FORCE) |

BIOLOGICALLY-INSPIRED MULTI-SEGMENTED ROBOT

FIELD OF INVENTION

The present invention relates to the field of robotics. More particularly, the present invention relates to biologically-inspired, multi-segmented robots.

BACKGROUND

In general, robots are electromechanical devices which are designed to perform one or more specific tasks that may be too complex, too difficult or too dangerous for humans. Robots have been used, and will continue to be used in numerous and diverse applications including biomedical applications, household or domestic applications, industrial applications, space and/or hazardous environment exploration applications, educational applications, toys, entertainment and many others.

While virtually all robots engage in some degree of movement, some robots may be described as fixed, while others may be described as mobile. Mobile robots are capable of moving or propelling themselves from one location to another location. Presumably, the ability to move from one location to another is essential for accomplishing the one or more tasks for which they are designed.

As one might expect, mobility may be achieved in any number of ways. For instance, some robots are designed with wheels. Other robots use tracks. Still others employ animal or human-like limbs (e.g., legs). FIG. 1 is a flow diagram that illustrates a conventional approach to mobility control for robots that fall into this latter category. As shown, mobility is achieved through a controller, which sends control commands or signals to an actuator, such as a metal piston or an electric motor. The actuator then drives a joint associated with a corresponding limb. If the limb comprises multiple joints, then multiple motors are also required, where each joint is independently driven by its own dedicated motor. FIG. 1 also indicates that conventional designs generally employ sensors, such as position encoders, as part of a sensor feedback loop, where the controller receives information from a corresponding sensor, and wherein the motor responds by actuating the corresponding joint accordingly. In conventional designs, the sensor feedback loop is the only mechanism that provides control and stability to the system. Conventional designs, as illustrated in FIG. 1, tend to be inefficient, slow, heavy, inflexible, and they depend on extremely complex, mathematically intensive control algorithms and computer-based control techniques.

A more specific example of a conventional, legged robot is described in a series of patents relating to U.S. Pat. No. 5,936,367. The robot described in these patents comprises two legs. Each leg, in turn, comprises six joints, where each joint is independently actuated by a corresponding electric motor. Such a robot could easily weigh 300 pounds, due to a large extent on the relatively heavy electric motors that generate the torque needed to actuate the joints.

As one skilled in the art will readily appreciate, a great deal of control is required to properly operate the electric motors needed to coordinate mobility in the conventional legged robot design described in U.S. Pat. No. 5,936,367. Generally, a sophisticated computer (e.g., a Sparc computer) is needed to perform the complex, brute-force computations which are necessary in order to achieve the required level of control. While these conventional designs generally work well in highly structured situations, where the environment does not significantly vary with respect to the models upon which the computer is programmed, these designs have serious limitations when used in unstructured environments.

Accordingly, there is a strong demand to develop biologically inspired robots, as an alternative to conventional robot designs which employ mathematical modeling and computationally intensive techniques to achieve mobility. In biologically inspired systems, nature's efficient solutions for controlling complex movements are integrated into the robot design, where artificial muscles, rather than pistons or electric motors, are typically used to control motion. Biologically inspired designs offer a faster, more efficient, flexible and versatile approach. However, a simple, intelligent mobility control technique for coordinating the various artificial muscles of a biologically inspired robot design is still needed.

SUMMARY OF THE INVENTION

The present invention involves biologically inspired, multi-joint, multi-segmented robots. More specifically, the present invention involves a logical, intelligent technique that does not rely on mathematical modeling or computationally intensive techniques to control the mobility of a biologically inspired, multi-joint, multi-legged robot. As such, the present invention relies upon certain artificial, anatomical and neuro-physiological features that are similar to features found in actual biological systems. For instance, the present invention employs muscle-like actuators. Each muscle-like actuator comprises an artificial muscle, or contractile portion, and an artificial tendon portion. The artificial tendons and artificial muscles resemble, both in form and function, their biological counterparts, such that they operate either actively or passively to provide "intelligent, spring-like" properties.

The present invention also takes advantage of the built-in, mechanical constraints that are associated with the aforementioned anatomical and neuro-physiological features. For example, each artificial tendon and artificial muscle is designed in accordance with a pre-selected operational range, which determines the force-length and force-velocity characteristics of the artificial tendons and muscles. In another example, the joints, such as the knee, are designed to be self-limiting, much like the human knee. Together, the utilization of artificial, anatomical and neuro-physiological features, and the mechanical constraints that are associated with these features provide mechanical feedback that is similar to the type of feedback that is inherent in genuine biological systems. This mechanical feedback helps to simplify the process of controlling the mobility of the multijoint robot.

In accordance with exemplary embodiments of the present invention, the muscle-like actuators are organized into functional muscle groups. Activation of the muscle-like actuators in functional muscle groups provides the necessary force and position control that is needed to achieve tasks such as walking, bending and grasping. Controlling the activation of the various muscle groupings is, in turn, controlled by a sequence of discrete "if-then", or "fuzzy if-then" logical rules, which may be optimized over time through reinforcement learning.

In view of that which is stated above, it is an objective of the present invention to provide a biologically inspired, multi-legged robot that employs anatomical and neuro-physiological features which exhibits self-limiting, mechanical constraints similar to those found in genuine biological systems.

It is another objective of the present invention to provide stable, efficient and natural mobility control through the use of muscle-like actuators rather than pistons or electric motors.

It is yet another objective of the present invention to provide mobility control for a multi-joint, multi-legged robot through the use of monoarticular and biarticular muscle-like actuators.

It is still another objective of the present invention to provide sensory feedback, to optimize the activation of the muscle-like actuators.

It is another objective of the present invention to provide the force and position control needed for mobility by activating, in tandem with each other, different functional muscle-like actuator groupings.

It is another objective of the present invention to provide stiffness control without the loss of energy that occurs with activation of two one-joint, antagonist muscle-like actuators, by simultaneously activating monoarticular and biarticular, antagonist, muscle-like actuators.

It is another objective of the present invention to provide a logical mobility control technique by employing performance based control, rather than control over each individual joint.

It is another objective of the present invention to provide control over the various functional muscle-like actuator groupings through the use of "if-then" or "fuzzy if-then" rules.

It is another objective of the present invention to provide reinforcement learning techniques to adjust the timing of the functional muscle-like actuator groupings, thereby optimizing mobility.

In accordance with a first aspect of the present invention, the above-identified and other objectives are achieved by a robot that includes a first anatomical segment, a second anatomical segment, and a joint which is attached to the first anatomical segment, where the first anatomical segment moves relative to the second anatomical segment as a function of an amount of rotation associated with the joint. The robot also includes a muscle-like actuator having a first end fixed to a position along the first anatomical segment and a second end fixed to a position along the second anatomical segment. The muscle-like actuator also has a predefined control operating range, such that when the muscle-like actuator is activated it undergoes a predefined change in length, which causes the joint to rotate by a corresponding, predefined amount that is a function of the predefined change in length and the positions along the first and second anatomical segments.

In accordance with another aspect of the present invention, the above-identified and other objectives are achieved by a robot that includes a plurality of anatomical segments and a plurality of joints, where each of the joints couples two adjacent anatomical segments such that the two adjacent anatomical segments move relative to each other as a function of an amount of rotation associated with the joint. The robot also includes a plurality of muscle-like actuators, each comprising a first end fixed to a position along one of the plurality of anatomical segments and a second end fixed to a position along a second one of the plurality of anatomical segments, where activation of a muscle-like actuator causes torque to be applied to at least one of the plurality of joints, thereby causing two or more of the anatomical segments to move relative to each other. In addition, the robot includes a controller which is coupled to each of the plurality of muscle-like actuators. The controller includes means for defining each of a plurality of states, where each of the plurality of states corresponds with a different functional grouping of muscle-like actuators, and where, for a given state, the muscle-like actuators associated with the corresponding functional grouping are defined as being activated and the muscle-like actuators that are not associated with the functional grouping are defined as being deactivated.

In accordance with yet another aspect of the present invention, the above-identified and other objectives are achieved by a biologically-inspired, multi-segmented robot. The robot includes a plurality of anatomical segments and a plurality of joints, where each of the plurality of joints couples two adjacent anatomical segments. The robot also includes a plurality of muscle-like actuators, where each of said muscle-like actuators includes a first and a second end, wherein the first end of each muscle-like actuator is attached to one of the plurality of anatomical segments, where the second end of each muscle-like actuator is attached to a second one of the plurality of anatomical segments, and where the plurality of muscle-like actuators and joints are configured so as to provide mechanical feedback for the muscle-like actuators. The robot further includes a controller, which activates one or more functional groupings of the muscle-like actuators to achieve a desired mobility event, and one or more sensors coupled to the controller and the anatomical segments, where the sensors provide feedback data to the controller, and where the feedback data defines a position associated with one or more of the anatomical segments.

In accordance with still another aspect of the present invention, the above-identified and other objectives are achieved through a method for controlling mobility in a biologically-inspired, multi-joint, multi-segmented robot. The method involves activating a first functional grouping of muscle-like actuators, which causes a repositioning of one or more of the multiple segments associated with the robot, so as to achieve a first mobility event. The method also involves measuring a status of the robot, and based thereon, determining whether the first mobility event has been achieved. The method then involves activating a second functional muscle grouping of muscle-like actuators, if it is determined that the first mobility event has been achieved, where the activation of the second functional muscle grouping causes a further repositioning of one or more of the multiple segments associated with the robot, so as to achieve a second mobility event.

In accordance with another aspect of the present invention, the above-identified and other objectives are achieved through a method for controlling mobility in a biologically-inspired, multi-joint, multi-segmented robot. The method involves quantifying a state of said robot and activating a first functional grouping of muscle-like actuators, to achieve a first desired mobility event, in accordance with a level of activation selected from a set of activation levels which includes at least one intermediate activation level. The first functional grouping of muscle-like actuators comprises a subset of all muscle-like actuators associated with the robot. The method also involves actuating one or more segments associated with the robot based on the activation of the first functional grouping of muscle-like actuators.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The present invention involves a biologically-inspired, multi-joint, multi-segmented robot that employs a logical, intelligent mobility control technique. The robot, as described in greater detail below, is biologically-inspired in that it employs anatomical and neuro-physiological features that are similar in form and function to those found in genuine biological systems, such as limbs, joints, and muscle-like actuators. Like their biological counterparts, these anatomical and neuro-physiological features exhibit mechanical and/or physiological constraints which inherently contribute to the control and stability of the robot.

Figure 1:
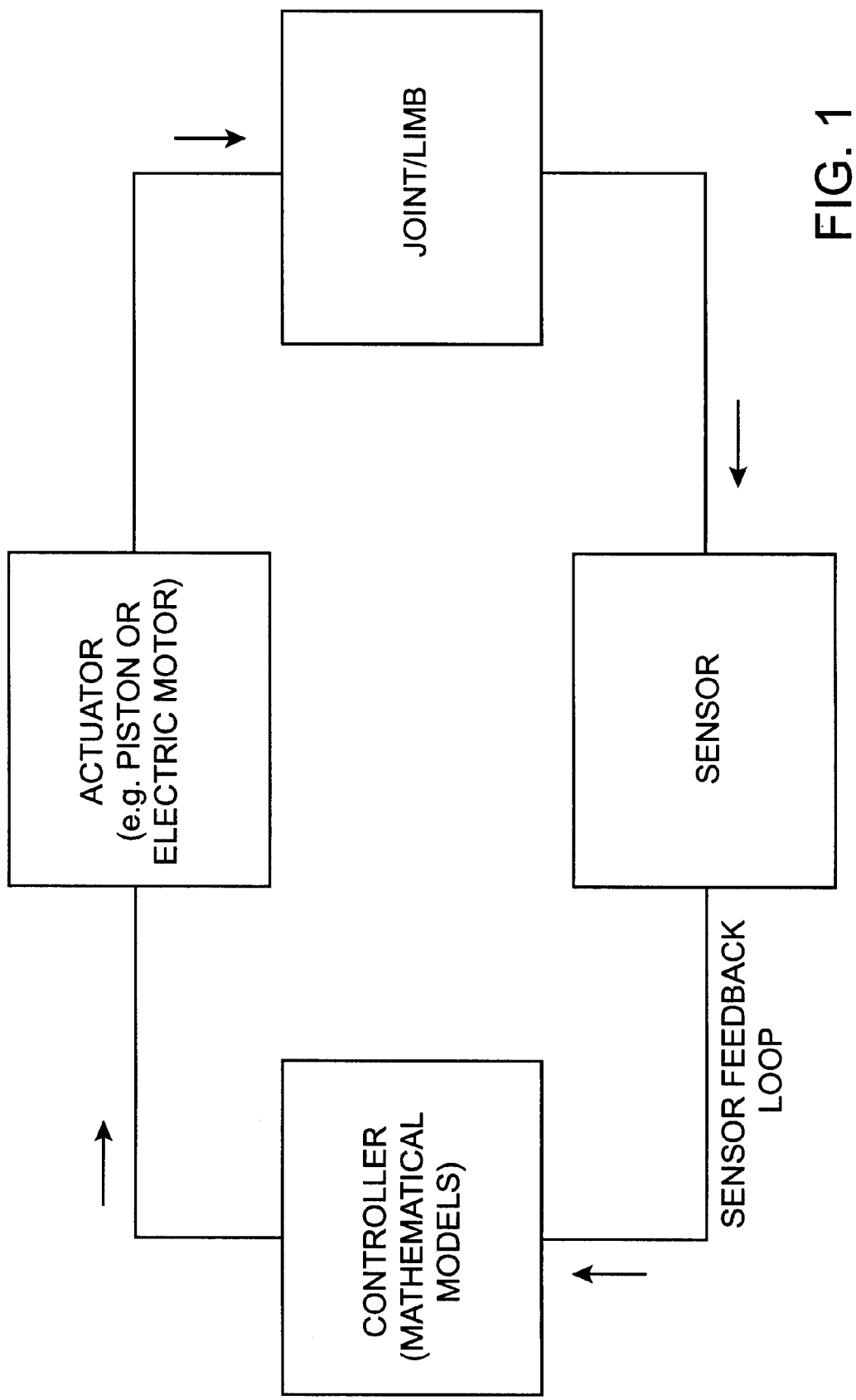
FIG. 1 illustrates conventional approach to mobility control.
Figure 2:
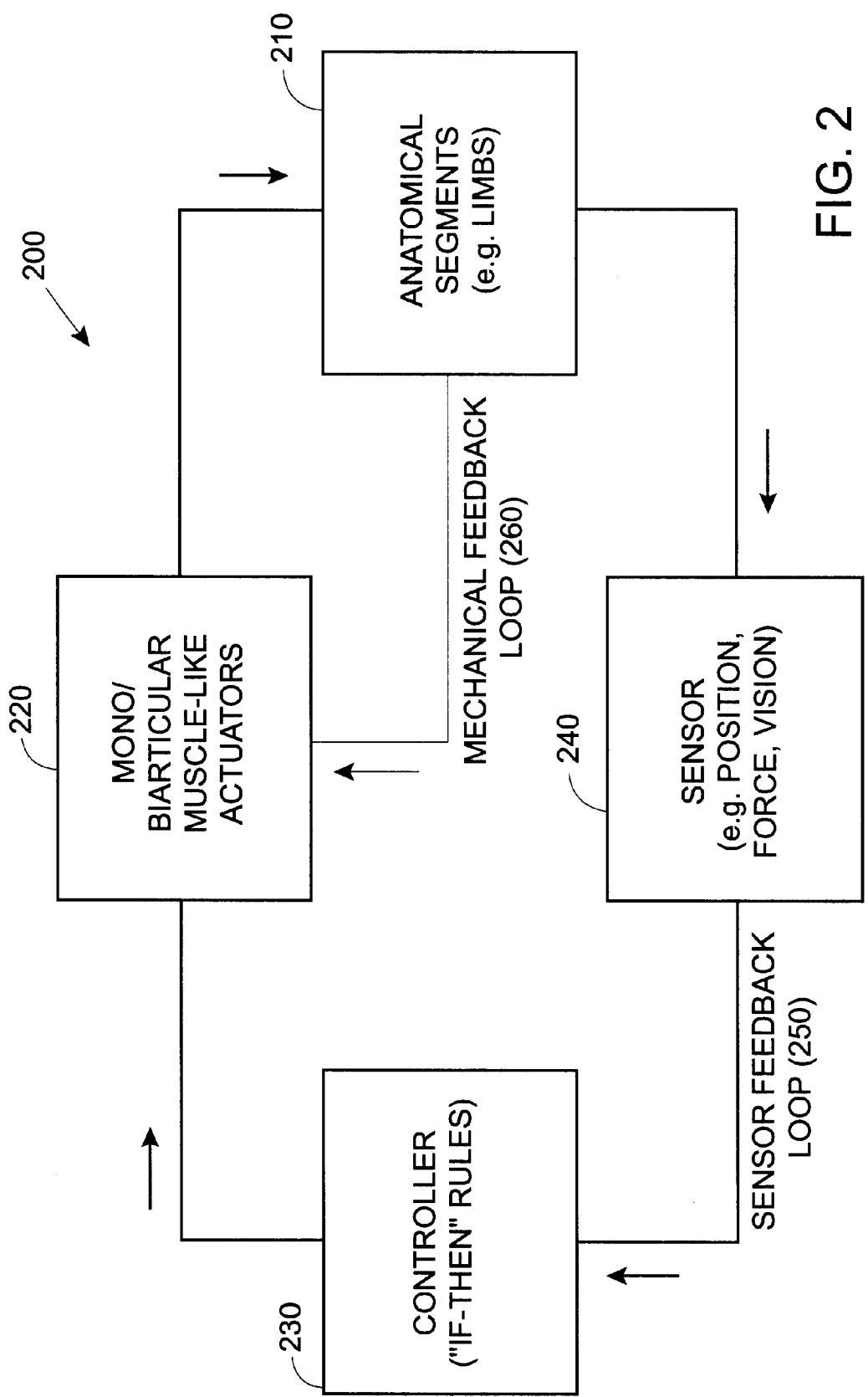
FIG. 2 provides an overview of the biologically-inspired, multi-joint, multi-segmented robot, in accordance with exemplary embodiments of the present invention.

FIG. 2 is a diagram that provides an overview of the biologically-inspired, multi-joint, multi-segmented robot, in accordance with exemplary embodiments of the present invention, and in particular, those features which most directly affect the robot's mobility. As illustrated, mobility is achieved by actuating one or more anatomical segments 210, such as, the upper, lower and/or foot-like segments associated with two or more legs. Actuating the one or more anatomical segments 210 is achieved, in turn, by activating one or more muscle-like actuators 220, where the activation of one or more of the muscle-like actuators causes the one or more anatomical segments 210 to move in a desired manner. Control over the activation of the one or more muscle-like actuators is provided by an "if-then" or "fuzzy if-then" rule-based logical control algorithm which is executed by a controller 230. As explained in greater detail below, the algorithm activates the muscle-like actuators 220 in functional groupings, referred to herein as functional muscle groups (FMG). As the terms suggest, a functional muscle group is simply a subset of all the muscle-like actuators, where activation of the muscle-like actuators belonging to that FMG causes a desired change in the positioning of the anatomical segments 210. By breaking down a desired mobility pattern into a sequence of anatomical segment position changes, mobility is more effectively and efficiently achieved by activating a sequence of corresponding FMGs. Finally, FIG. 2 shows that in accordance with a preferred embodiment of the present invention, the controller 230, and hence, the aforementioned logical control algorithm, depends on information from one or more sensors 240, such as, position sensors and/or pressure sensors.

FIG. 2 also illustrates several important distinctions between the present invention and the aforementioned conventional approach. First, in the present invention, the anatomical segments 210 move as a result of physical forces that are applied directly to the anatomical segments 210 by the muscle-like actuators 220. In contrast, electromechanical actuators such as pistons or motors are used in the conventional approach to drive a joint between two adjacent anatomical segments. Second, the biologically-inspired approach of the present invention does not rely on complex mathematical models to control mobility. Rather, "if-then" rules are used to logically and effectively activate the appropriate FMGs to achieve a desired mobility pattern, such as walking, running, bending, or grasping. In the conventional approach, complex mathematical models are needed to simultaneously control the output of each of the numerous electromechanical actuators needed to drive the robot's joints. Finally, FIG. 2 indicates that control over the muscle-like actuators 220 is aided not only by a sensor feedback loop 250, but also a mechanical feedback loop 260, which provides added stability and control to the biologically-inspired robot. The mechanical feedback loop 260 is now described in greater detail hereinbelow.

FIG. 2 shows that the muscle-like actuators 220 receive control signals from two different feedback loops: a sensor feedback loop 250 and a mechanical feedback loop 260. While the sensory feedback loop 250 provides control and stability to the robot by providing controller 230 with the information it needs to activate the appropriate FMGs, the mechanical feedback loop 260 provides additional, continuous control and stability to the robot based on the physiological characteristics and mechanical constraints associated with the muscle-like actuators 220 and the joints connecting the various anatomical segments. For example, mechanical feedback is not only provided when a given muscle-like actuator is in a contracted (i.e., active) state, but also when the muscle-like actuator is in a relaxed (i.e., passive) state. The reason for this is that any change in the length of the muscle-like actuator from its static or relaxed state results in an opposing force that acts to bring the system (i.e., one or more anatomical segments and the joints connecting them) back to their original or relaxed state. Although the biologically-inspired robot of the present invention could exclusively operate based on the mechanical feedback loop 260, both the sensory feedback loop 250 and the mechanical feedback loop 260, in practice, play an important role in the control and stability of the robot.

In order to fully appreciate the capabilities that the present invention provides, each of the primary system elements: the anatomical segments 210, the muscle-like actuators 220, the controller 230, and various sensors 240, and the manner in which they interact with each other, is described in greater detail hereinbelow.

Anatomical Segments

Figure 3:
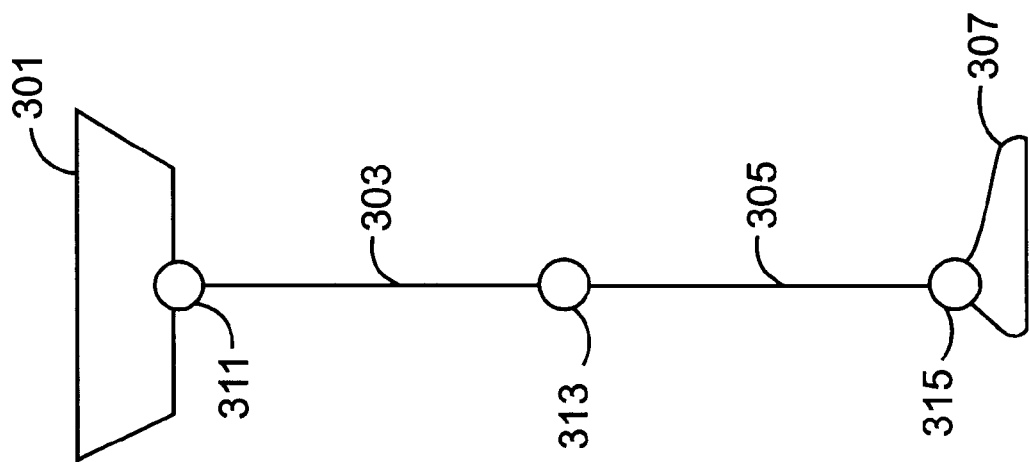
FIG. 3 illustrates a number of exemplary anatomical segments.

FIG. 3 illustrates a number of exemplary anatomical segments 301, 303, 305 and 307. Anatomical segment 301, for example, may represents a pelvic segment and/or lower torso portion of a bipedal robot. Anatomical segments 303 and 305 may represent the upper and lower portion of a leg, respectively. Anatomical segment 307 may represent a foot. In order to achieve mobility, each anatomical segment must be capable of moving relative to the other anatomical segments. Consequently, the various anatomical segments are connected to an adjacent anatomical segment by a joint, such as a hip joint 311, knee joint 313 and ankle joint 315. Although FIG. 3 uses a limb (i.e., a leg) to illustrate the concept of anatomical segments, one skilled in the art will readily appreciate that the robot may, and all likelihood will, comprise many more anatomical segments than those illustrated in FIG. 3, including anatomical segments that are not necessarily associated with a limb, such as, the robots head, neck or torso.

Muscle-Like Actuators

A. General Description of the Muscle-Like Actuators

Figure 4:
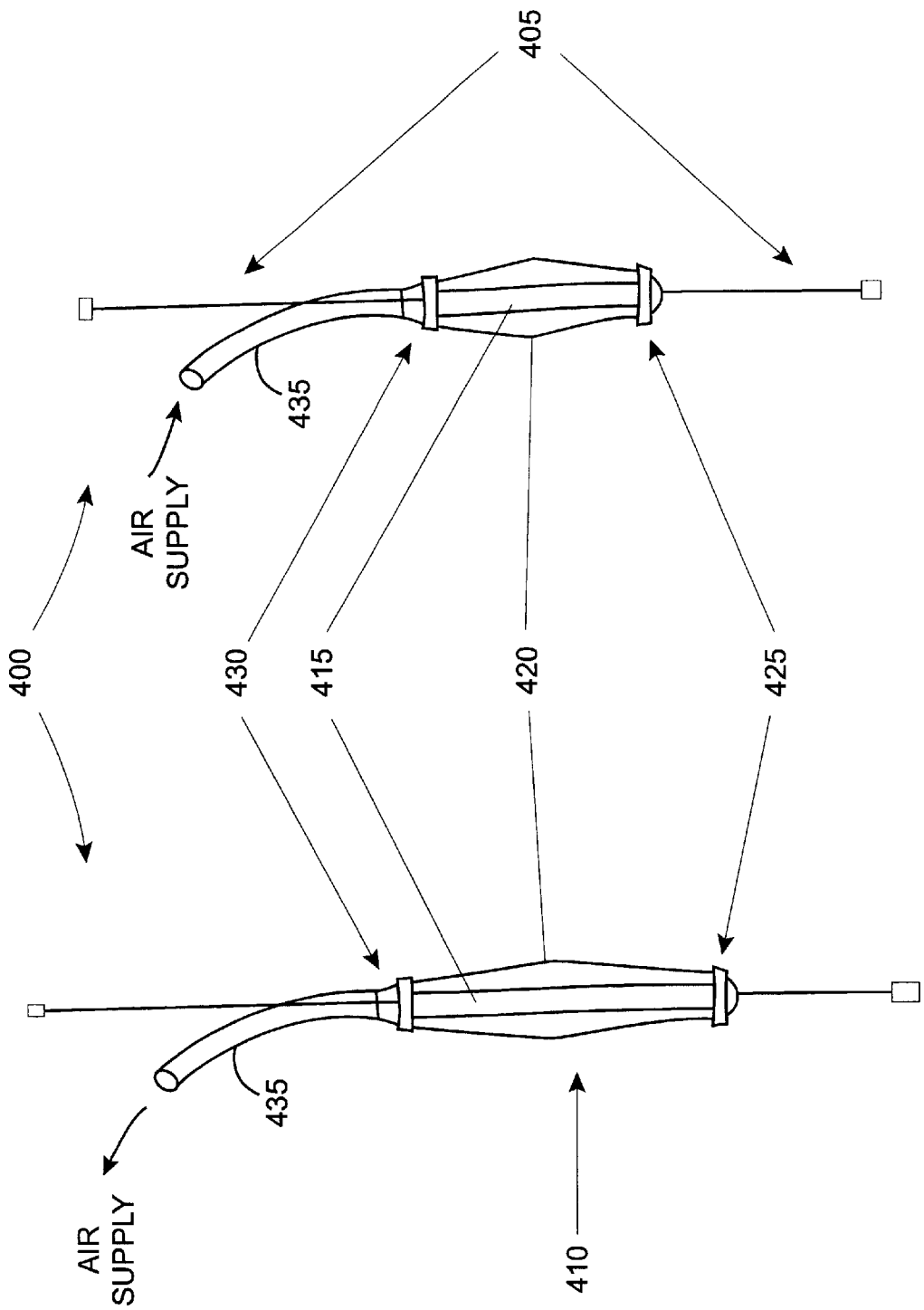
FIGS. 4A–B provide a cross-sectional illustration of an exemplary muscle-like actuator.

As previously stated, exemplary embodiments of the present invention employ muscle-like actuators 220 to physically move the anatomical segments 210 relative to each other to achieve mobility. FIGS. 4A–B each illustrate a partial, cross-sectional diagram of an exemplary muscle-like actuator 400, where the muscle-like actuator is shown in a relaxed state in FIG. 4A and in a contracted state in FIG. 4B. The muscle-like actuator 400 comprises two primary portions: an artificial tendon portions 405 and an artificial muscle, or contractile portion 410.

In a preferred embodiment of the present invention, the artificial tendon portion 405 comprises two parts, a superior part and an inferior part, as shown. However, it will be readily apparent that the muscle-like actuators may employ an artificial tendon comprising only one part, or alternatively, no artificial tendon portion. The artificial tendon portion 405 primarily serves as a means to attach the muscle-like actuator 400 to appropriate positions along two corresponding anatomical segments. The artificial tendons 405 may be implemented using wire, cord, fiber or the like. Alternatively, the artificial tendon portion 405 might be implemented using a complaint material.

The artificial muscle portion 410, in turn, comprises a flexible tube 415 inside a braided or mesh sleeve 420. As shown, one end 425 of the artificial muscle portion 410 is closed, while the other end 430 is open and connected to an air supply line 435. When pressurized air is supplied, the artificial muscle portion 410 contracts, as shown in FIG. 4B, thereby shortening the overall length of the muscle-like actuator 400. This, in turn, generates a force which causes a torque to be applied at the joint or joints which the muscle-like actuator 400 traverses. While the muscle-like actuator 400 employs an artificial muscle portion 410 that is activated using pressurized air, one skilled in the art will readily appreciate the fact that the present invention may be implemented using muscle-like actuators that employ other types of artificial muscles, including, but not limited to, artificial muscles that are made from electro-active polymers, chemically-active polymers, or shape memory alloys.

B. Implementation of the Muscle-Like Actuators

Figure 5:
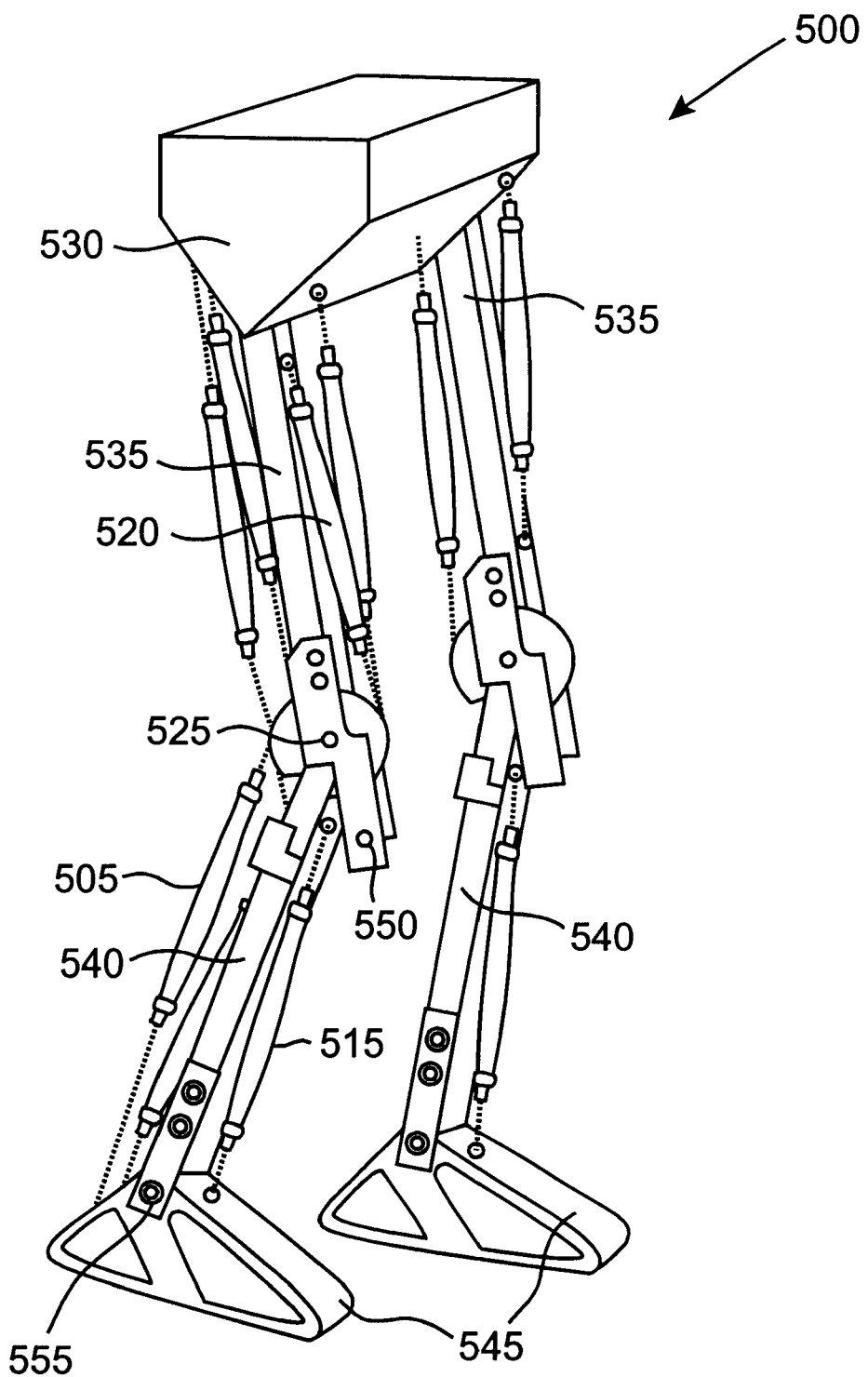
FIG. 5 illustrates a number of exemplary muscle-like actuators attached to predetermined position along two corresponding anatomical segments.

FIGS. 4A–B illustrate a single, exemplary muscle-like actuator. FIG. 5, in contrast, illustrates a number of exemplary muscle-like actuators, such as muscle-like actuators 505, 515 and 520, wherein each of the muscle-like actuators are attached to predetermined positions along two corresponding anatomical segments, for example, any two of anatomical segments 530, 535, 540 or 545, associated with the biologically-inspired, bipedal robot 500. The muscle-like actuators are essentially specialized linear actuators, where the dynamics associated with the muscle-like actuators resemble the dynamics of genuine biological muscles. As such, the muscle-like actuators do not necessarily apply torque at the corresponding joints over their full degrees of freedom. Therefore, it is necessary to properly identify, for each muscle-like actuator, an appropriate control operating range so that each muscle-like actuator is capable of performing a specific function or exhibiting a specific behavior. For instance, the primary function of the muscle-like actuator 520 may be the extension of the knee. Consequently, its selected control operating range is designed to rotate the knee joint 525 from, for example, 120 degrees (i.e., the knee in a flexed position) to 180 degrees (i.e., the knee in a fully extended position). At 180°, the knee is locked by a kneecap 550. Another example is the muscle-like actuator 515 that is primarily responsible for lifting the foot segment 545. Here, the control operating range need only accommodate the rotation of the ankle joint 555 by 15 degrees to support walking, running or a similar mobility pattern.

A more detailed description is now provided regarding the selection of the control operating range for each muscle-like actuator. In general, the selection of a control operating range for a muscle-like actuator consists of several basic steps. First, the selection process involves selecting the shortening range of the muscle-like actuator, where a distinction is made based on whether the muscle-like actuator can be categorized as a monoarticular (i.e., one joint) actuator or a biarticular (i.e., two-joint) actuator. For example, monoarticular actuators need relatively large shortening ranges since they are generally responsible for moving the joints. In contrast, biarticular actuators need relatively small shortening ranges since they are generally responsible for stiffness control and/or force direction control. The process of selecting a control operating range also involves selecting the relative, angular joint rotation attributable to the muscle-like actuator, wherein a monoarticular actuator contributes to the rotation of a single joint, while a biarticular actuator contributes to the rotation of two joints. Furthermore, the process involves selecting the absolute angular rotation provided by the muscle-like actuator. Selecting the absolute angular rotation, in turn, involves determining the position of the muscle-like actuator with respect to the corresponding anatomical segments to which it attaches. This can only be accomplished once the first two steps have been completed, as will be explained in greater detail hereinbelow.

Figure 6A:
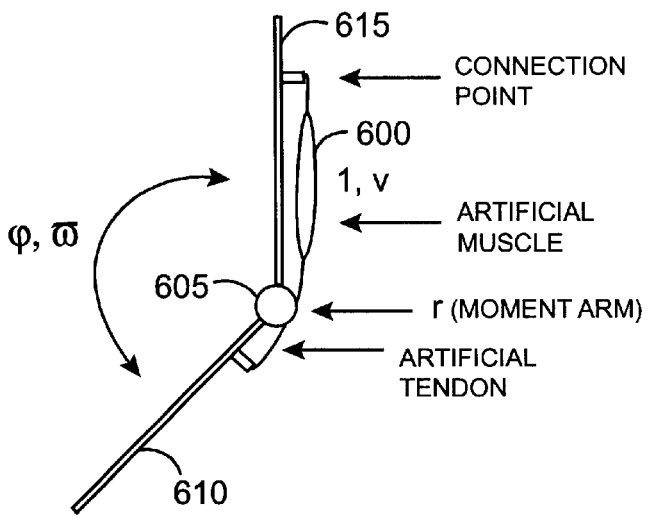
FIGS. 6A–C illustrate the relationship between certain variables and constants which are relevant to the procedure for selecting a control operating range for a monoarticular muscle-like actuator.
Figure 6B:
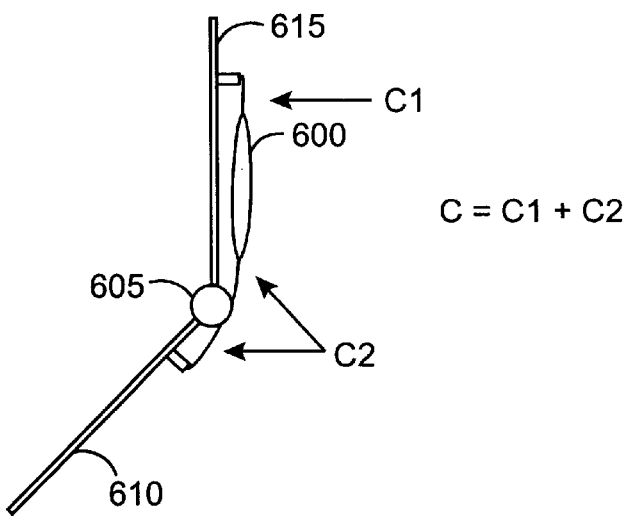
Figure 6C:
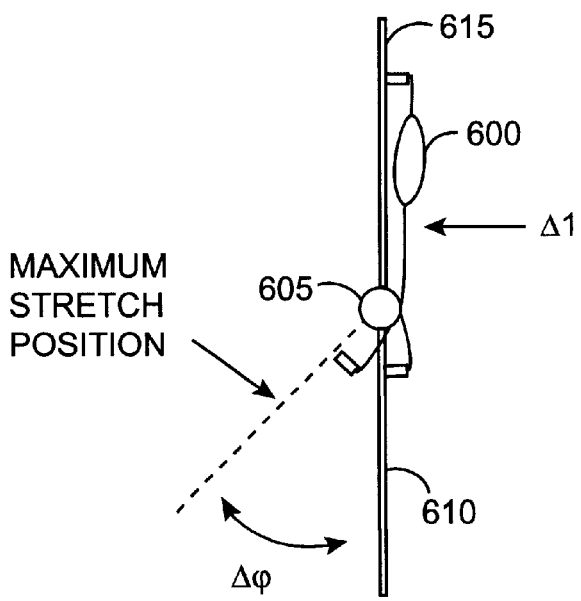

FIGS. 6A–C help to illustrate the procedure for selecting a control operating range for a monoarticular muscle-like actuator 600, where the monoarticular muscle-like actuator 600 spans a single joint 605 and it attaches to a first anatomical segment 610 and a second anatomical segment 615, and where the monoarticular muscle-like actuator 600 has a resting length l. The procedure for selecting a control operating range for monoarticular muscle-like actuator 600 begins with equation (1) below:

$$v = \omega * R \qquad (1)$$

wherein v represents the linear shortening velocity of monoarticular muscle-like actuator 600, ω represents the angular velocity at joint 605, and R represents a moment arm (i.e., the perpendicular distance from the muscle-like actuator 600 to the joint axis). Then, taking the integral of equation (1) results in equation (2) below.

$$\int v dt = \int \omega * R * dt \quad (2)$$

In FIG. 6A, the moment arm r is shown as a function of the joint angle φ. The moment arm, however, remains more or less constant as the joint geometry constrains the movement of the artificial tendon. Thus, the moment arm is designated by R rather than r. The assumption that the moment arm R is constant gives rise to equation (3) below:

$$l = \phi * R + C \quad (3)$$

wherein the constant C represents the overall length of the artificial tendon portion of the muscle-like actuator 600, as shown in FIG. 6B, and wherein the constant C equals the sum of C1 and C2.

Equation (3) represents an absolute relationship. However, a relative relationship is provided in equation (4) below, wherein the constant C is eliminated.

$$\Delta l = \Delta \phi * R \quad (4)$$

Equations (5) and (6) below are variations of equation (4), such that any one can then be used to determine the desired control operating range for monoarticular muscle-like actuator 600.

$$\Delta \phi = \frac{\Delta l}{R} \quad (5)$$

$$R = \frac{\Delta l}{\Delta \phi} \quad (6)$$

In the case of equation (4), the angular operating range Δφ and moment arm R may be used to determine the required change in length Δl of the muscle-like actuator 600. In the case of equation (5), the change length Δl of muscle-like actuator 600 and the moment arm R may be used to determine the angular operating range Δφ. In the case of equation (6), the change in length Δl of muscle-like actuator 600 and the desired angular operating range Δφ may be used to determine the required moment arm R.

The values associated with the parameters in equations (4) through (6) are relative. For example, an angular contribution of the muscle-like actuator could be 30 degrees, however, where these 30 degrees contribute to the motion of the corresponding segments depends on the selection of a value for the constant C. Selecting a value for the constant C makes the angular contribution of the muscle-like actuator absolute.

As stated above, the constant C represents the length of the artificial tendon portion of muscle-like actuator 600, where the artificial tendon portion primarily serves to connect the muscle-like actuator 600 at a connection point along segment 615 and a connection point along adjacent segment 610. The selection of a value for the constant C is guided by a choice as to where the angular rotation should take place. In practice, selecting a value for the constant C comes down to selecting a value for the constant C1, as the value associated with the constant C2 is generally fixed.

FIGS. 7A–D help to illustrate the procedure for selecting a control operating range for a biarticular muscle-like actuator 700, where the biarticular muscle-like actuator 700 spans two joints 705 and 710, and it attaches to first and second anatomical segments 715 and 720. The procedure for selecting a control operating range for biarticular muscle-like actuator 700 begins with equation (7) below:

$$v = \omega 1 * R1 + \omega 2 * R2 \quad (7)$$

where the variable v represents the linear shortening velocity of biarticular muscle-like actuator 700, ω1 represents the angular velocity at joint 705, ω2 represents the angular velocity at joint 710, R1 represents the moment arm (i.e., the perpendicular distance from muscle-like actuator 700 to the axis associated with joint 705), and R2 represents the moment arm (i.e., the perpendicular distance from muscle-like actuator 700 to the axis associated with joint 710). Then, taking the integral of equation (7) results in equation (8), as shown below.

$$\int v dt = \int \omega 1 * R1 * dt + \int \omega 2 * R2 * dt \quad (8)$$

As before, if it is assumed that moment arm R is constant, equation (8) gives rise to equation (9) below.

$$l = \phi 1 * R1 + \phi 2 * R2 + C \quad (9)$$

Equation (9) represents an absolute relationship. However, if the constant C is ignored, equation (9) gives rise to equation (10), which represents a relative relationship.

$$\Delta l = \Delta \phi 1 * R1 + \Delta \phi 2 * R2 \quad (10)$$

Equation (10) is then used to calculate the change of length Δl, angle, Δφ1 and Δφ2, or moment arm, R1 and R2. Since another term is present, due to the second joint spanned by the muscle-like actuator 700, one has to select one of the terms on the right-hand side of equation (10) to determine the length, angle or moment arm while ignoring the other term. This is possible since here the calculations only involve a relative relationship. For example, assume that the maximum shortening range Δl is 1 cm, and that R1 (at the knee) is 2 cm and that R2 (at the ankle) is 3 cm. Then, using equation (10), the relative joint rotations attributable to the biarticular muscle-like actuator 700 are 28 degrees for the knee and 19 degrees for the ankle. Again, these calculations and parameter selections are relative. How these angular changes contribute to the movement of the anatomical segments 715, 720 and 725, as shown in FIGS. 7A–D, depends on the selection of a value for the constant C.

Figure 7D:
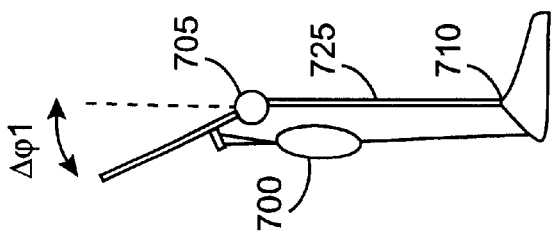
FIGS. 7A–D illustrate the relationship between certain variables and constants which are relevant to the procedure for selecting a control operating range for a biarticulate muscle-like actuator.
Figure 7C:
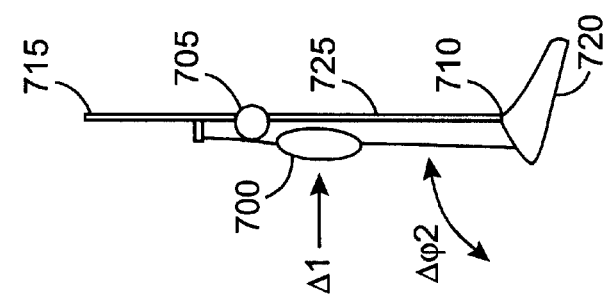
Figure 7B:
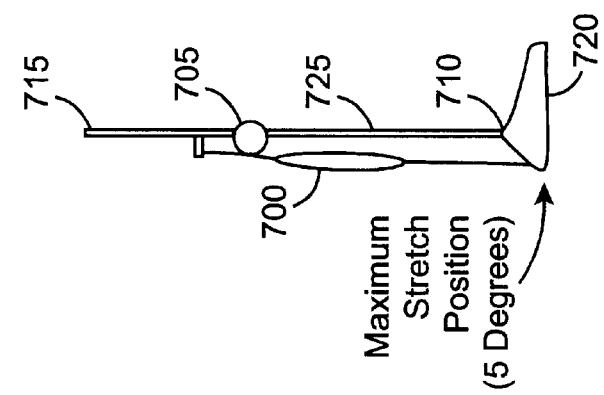
Figure 7A:
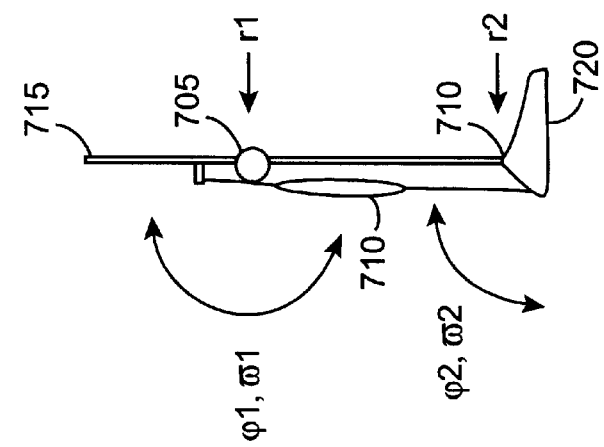

As previously stated, the constant C represents the length of the artificial tendon portion or portions of muscle-like actuator 700, where the artificial tendon portions connect muscle-like actuator 700 to anatomical segment 715 and to anatomical segment 720, thereby crossing the two joints 705 and 710, and anatomical segment 725. These two joints 705 and 710 connect the three segments 715, 720 and 725. The selection of the value for the constant C is guided by a choice as to where the angular rotation should take place. In the case of the biarticular muscle-like actuator 700, which crosses the ankle joint 710 and the knee joint 705, the constant C represents the remaining length when the knee is straight (i.e., fully extended) and the ankle is at 5 degrees, as illustrated in FIG. 7B. Given these angular positions, the muscle-like actuator 700 should be maximally stretched, and the absolute angular contribution associated with the biarticular muscle-like actuator 700 has been determined.

Figure 8B:
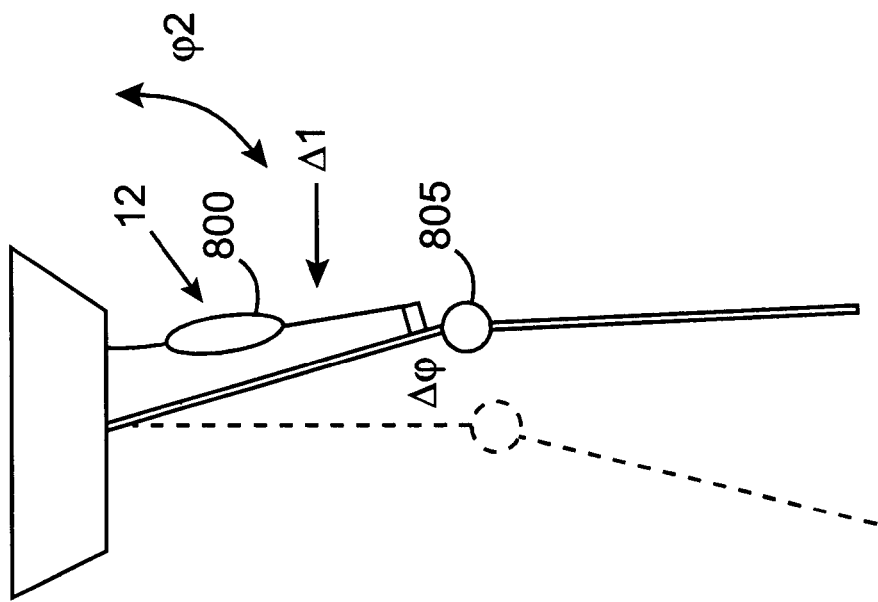
FIGS. 8A–B illustrate the relationship between certain variables and constants which are relevant to the procedure for selecting a control operating range for a monoarticular muscle-like actuator when the moment arm is not constant.
Figure 8A:
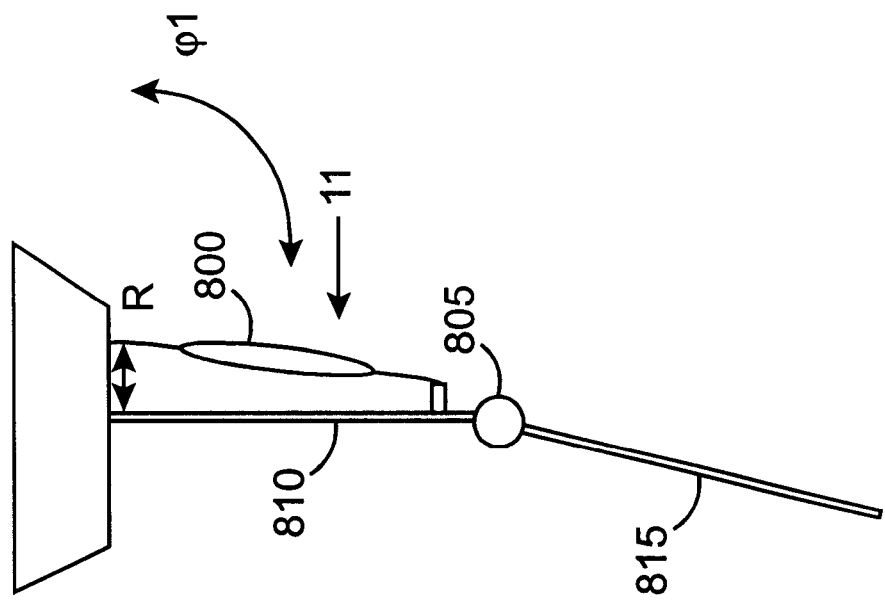

FIGS. 8A–B illustrate the process of selecting a control operating range for a monoarticular muscle-like actuator 800 when the moment arm r is not constant, where monoarticular muscle-like actuator 800 spans a single joint 805, attaches to a first and second segment 810 and 815, and where monoarticular muscle-like actuator 800 has a resting length of l1 and a shortened length of l2. In this instance, the moment arm r is actually a function of the joint angle φ. The procedure for selecting the control operating range for the muscle-like actuator 800 beings with equation (11):

$$v = \omega * r \quad (11)$$

where R, in FIG. 8A, is the constant moment arm for a given reference position, and where the relationship between R and r is given by equation (12).

$$r = R * \sin\phi \quad (12)$$

Equation (13) is then obtained by substituting equation (12) into equation (11).

$$v = \omega * R * \sin\phi \quad (13)$$

Equation (14) is obtained by taking the integral of equation (13):

$$\int v \, dt = \int \omega * R \sin\phi * dt \quad (14)$$

where equation (14) can be rewritten in the form of equation (15) below.

$$l = -R \cos\phi + C \quad (15)$$

The change in the length of muscle-like actuator 800 Δl, where l1 is greater than l2, is given by equation (16).

$$\Delta l = l2 - l1 \quad (16)$$

Equation (17) is then obtained by combining equation (15) and equation (16).

$$\Delta l = R * \cos\phi 2 + R * \cos\phi 1 \quad (17)$$

Equation (17) is then used to determine the desired operating control range for monoarticular muscle-like actuator 800, where the moment arm R is defined for a reference position with respect to joint angle φ1, as shown in FIG. 8A. For example, if φ1 is 90 degrees, R is 3 cm and Δl is −2 cm, then φ2 is 48 degrees and Δφ is 42 degrees. It will be appreciated that equations (11) through (17) can be extended for the purpose of deriving the control operating range for a biarticular muscle-like actuator.

Figures 9A, 9B:
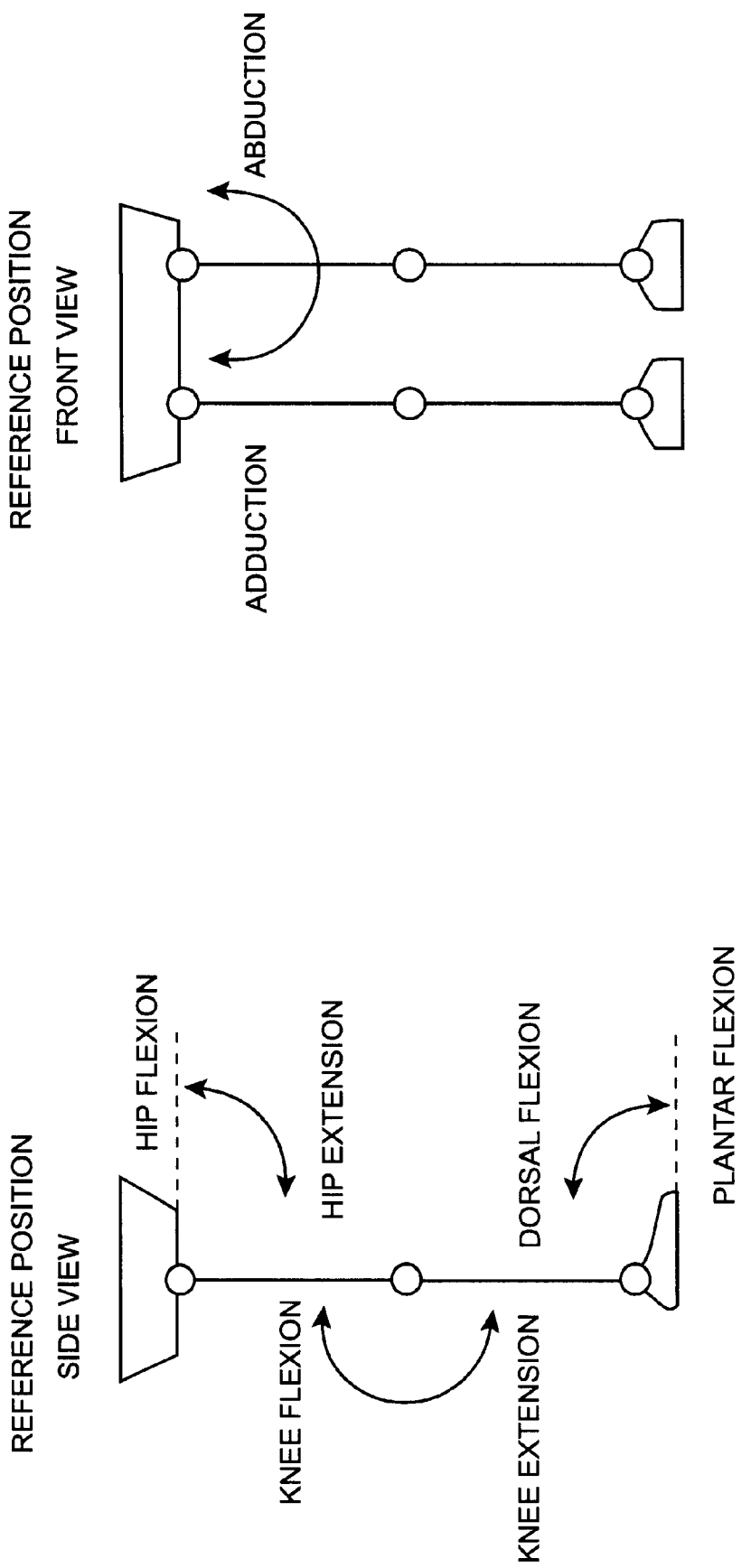
FIGS. 9A–B illustrate the reference positions upon which the control operating ranges in Table I are based.

Table 1 presents selected control operating ranges, Δφ for eight exemplary monoarticular muscle-like actuators and three exemplary biarticular muscle-like actuators, associated with a biologically-inspired, multi-segmented, bipedal robot. FIGS. 9A–B illustrate the reference positions upon which the control operating ranges presented in Table 1 are based.

If the muscle-like actuators are being controlled in a discrete fashion, in accordance with a discrete control algorithm, as described in greater detail below, and it becomes desirable to have an option of increasing or decreasing the rotation of a joint over which a given muscle-like actuator spans, it is possible to accomplish this by simply adding another muscle-like actuator across that joint. The additional muscle-line actuator would, of course, have a different moment arm and/or linear operating range than the existing muscle-like actuator, where the moment arm and/or linear operating range corresponds with the desired increase or decrease in joint rotation.

TABLE 1

| Muscle-like actuator | Action at joint(s) | Δφ (degrees, from reference angle) |
|---|---|---|
| MONOARTICUILAR MUSCLE-LIKE ACTUATORS | | |
| Hip extensor | See FIG. 9 | 10 |
| Hip flexor | | 40 |
| Abductor | | 10 |
| Adductor | | 5 |
| Knee extensor | | 70 |
| Knee flexor | | 40 |
| Plantar flexor | | 30 |
| Dorsal flexor | | 15 |
| BIARTICULAR MUSCLE-LIKE ACTUATORS | | |
| Rectus femoris | Hip flexion | 10 (knee in reference position) |
| | Knee extension | 10 (hip in reference position) |
| Hamstrings | Hip extension | 10 (knee in reference position) |
| | Knee flexion | 10 (hip in reference position) |
| Gastrocnemius | Knee flexion | 30 (knee in reference position) |
| | Plantar flexion | 20 (knee in reference position) |

Figure 16A:
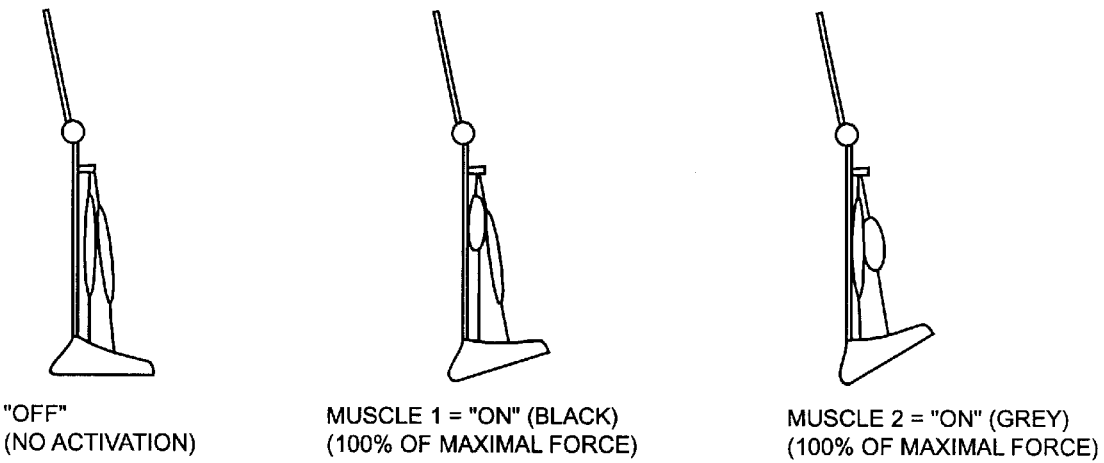
FIGS. 16A–B illustrate two exemplary techniques for increasing or decreasing the rotation of a joint.
Figure 16B:
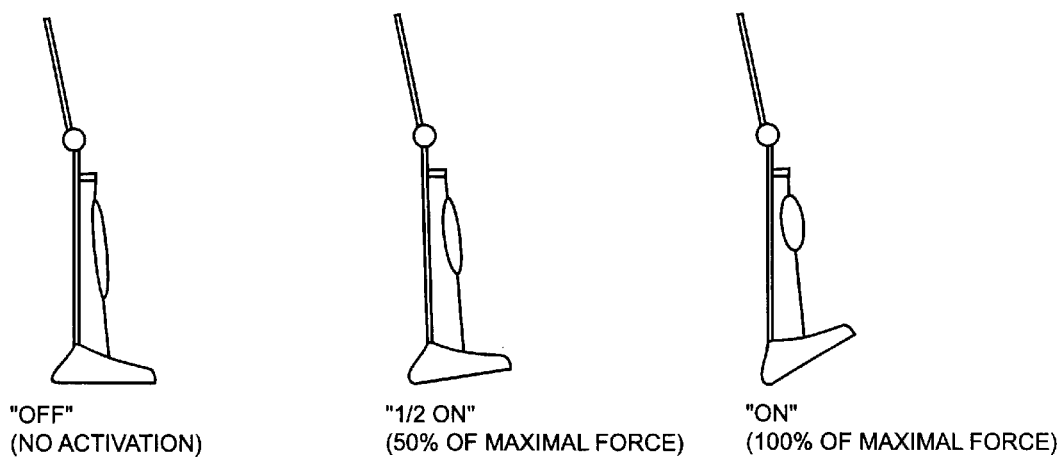

FIG. 16A illustrates this technique of adding an additional muscle-like actuator across a joint to provide the option of increasing or decreasing the rotation of a joint. The advantage of this technique is that there is not need to employ continuous or gradual control over each individual muscle-like actuator to achieve the alternative amount of joint rotation. As one skilled in the art will readily understand, this greatly simplifies the control process. In contrast, FIG. 16B illustrates the alternative technique for providing an optional degree of joint rotation. As indicated, the alternative technique requires that the control algorithm provide continuous or gradual control over the muscle-like actuator.

C. Functional Muscle Groupings

Figure 10:
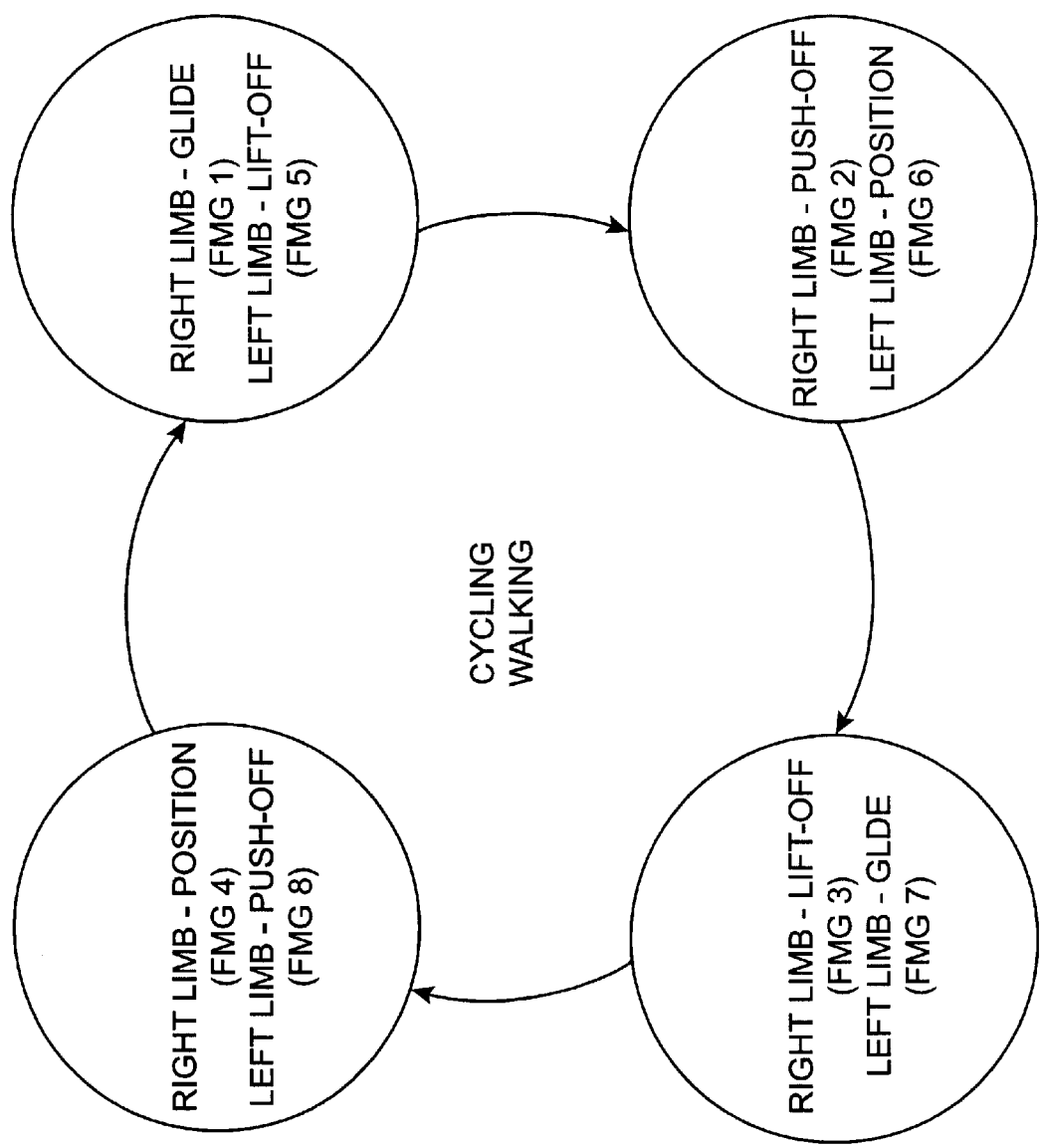
FIG. 10 illustrates a sequence of mobility events associated with rhythmic walking.

A mobility pattern, such as walking, running, bending or grasping may be defined as a sequence of mobility phases. Each phase may be further defined as a sequence of mobility events. For example, rhythmic walking may be defined as a sequence of two mobility phases: a stance phase and a swing phase. The stance phase, in turn, may be defined in terms of a sequence of two mobility events: a gliding event and a push-off event. Similarly, the swing phase may be further defined in terms of a sequence of two mobility events: a lift-off event and a positioning event. Thus, the right leg of a bipedal robot, in accordance with exemplary embodiments of the present invention, engaging in rhythmic walking would cycle through the following four mobility events: gliding, push-off, lift-off and positioning, in sequence. Simultaneously, the left leg of the bipedal robot would cycle through the events: lift-off, positioning, gliding and push-off. It should be noted that the left leg and the right leg of the bipedal robot are approximately 180 degrees out of phase with respect to each other as they cycle through the four exemplary mobility events associated with rhythmic walking. FIG. 10 is a state diagram which illustrates this sequence of mobility events associated with rhythmic walking.

In accordance with a preferred embodiment of the present invention, a desired mobility event (e.g., gliding, push-off, lift-off, positioning) is achieved by simultaneously activating a select number of muscle-like actuators. As previously stated, this select number of muscle-like actuators is referred to as a functional muscle group or FMG. In general, each mobility event, regardless whether the event is associated with rhythmic walking or another mobility pattern, is associated with a different FMG, as each mobility event requires the activation of a different set of muscle-like actuators.

Thus, for example, gliding would require the activation of a different set of muscle-like actuators than push-off, lift-off or positioning.

A FMG may be defined as a combination of monoarticular and/or biarticular muscle-like actuators. As previously mentioned, monoarticular actuators need relatively large shortening ranges since they are responsible for moving joints. Accordingly, FMGs containing only monoarticular actuators are typically employed for controlling the position of a multi-segmented system, such as, though not limited to flexion or extension of a limb. Biarticular actuators, however, need relatively small shortening ranges since they are generally responsible for, though not limited to, stiffness control and/or force direction control. Accordingly, FMGs containing biarticular actuators are typically employed for stiffness control and/or force control. Thus, when designing a FMG, one skilled in the art will appreciate that not all combinations of monoarticular and biarticular muscle-like actuators are possible. In fact, only a number of combinations are useful, in that they are capable of providing the mobility and/or force control required. Moreover, when designing a FMG, it is important to select the appropriate combinations of monoarticular and biarticular antagonist muscle-like actuators, in order to minimize energy losses when the FMG is activated. For at least these reasons, it is important that the above-identified information be taken into account when designing a FMG in order for the FMG to provide the appropriate force and position control needed to achieve the type of mobility that the multi-segmented robot is expected to engage in.

Figure 11:
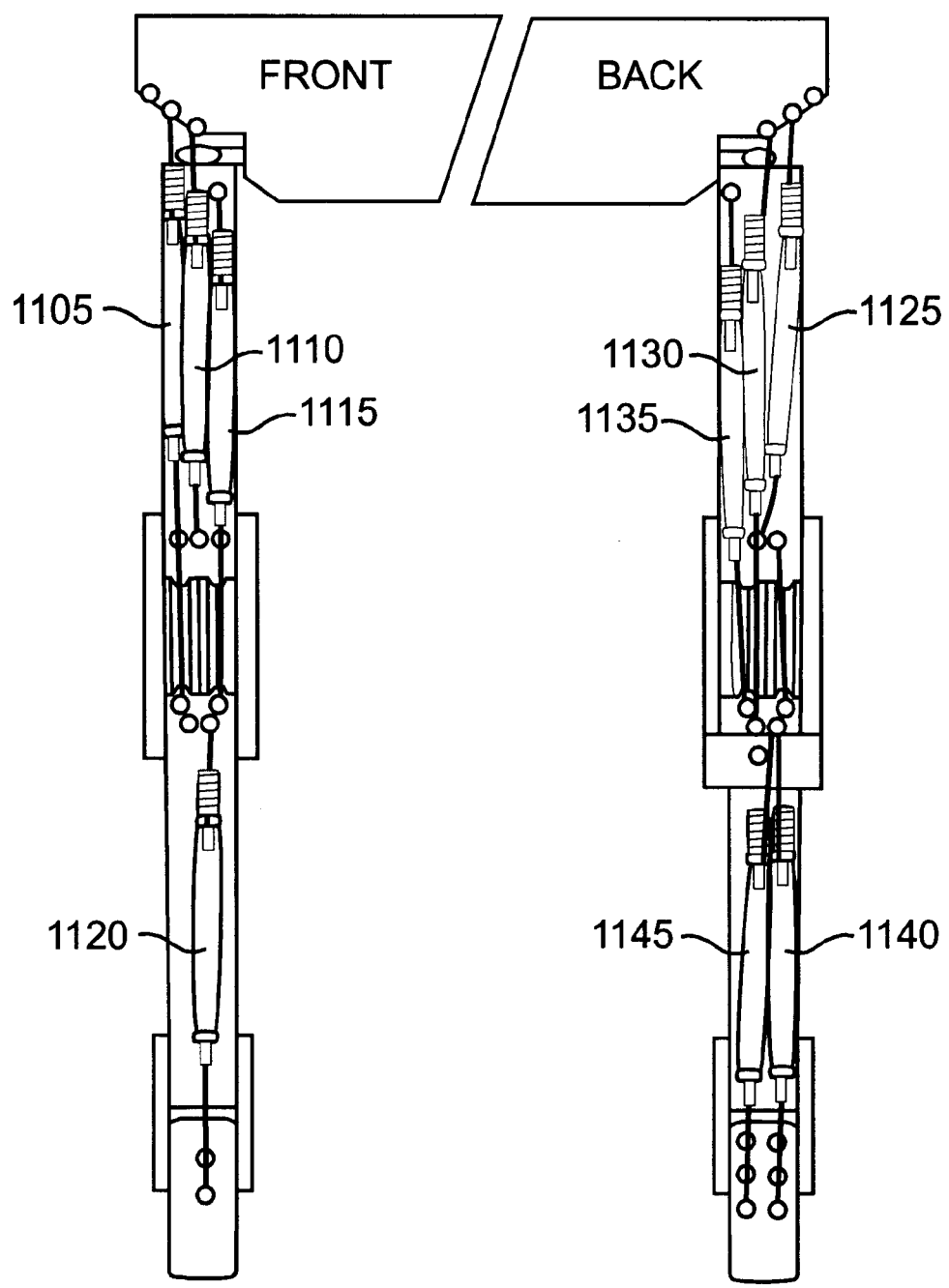
FIG. 11 illustrates the front and back side of a right leg associated with a biologically-inspired, bipedal robot.

FIG. 11 illustrates the front side and the back side of a right leg associated with a biologically-inspired, bipedal robot. As shown, the front side of the right leg includes four exemplary muscle-like actuators: the rectus femoris 1105, the iliopsoas 1110, the vasti 1115 and the tibialis interior 1120, wherein the rectus femoris 1105 is a biarticular muscle-like actuator and the iliopsoas 1110, the vasti 1115 and the tibialis interior 1120 are monoarticular muscle-like actuators. The back side of the leg includes five exemplary muscle-like actuators: the gluteus maximus 1125, the hamstring 1130, the biceps femoris short head 1135, the gastronemius 1140 and the soleus 1145. Of these five exemplary muscle-like actuators, only the hamstring 1130 and the gastrocnemius 1140 are biarticular muscle-like actuators.

Given the four exemplary mobility events associated with rhythmic walking, as illustrated in FIG. 10, and given the exemplary set of muscle-like actuators illustrated in FIG. 11, Table 2 then identifies the FMGs that might be employed to achieve rhythmic walking. For example, in order for the right leg of the bipedal robot to engage in the mobility event of gliding, a first FMG (i.e., FMG1) might be activated, wherein FMG1 comprises the vasti 1115 and the hamstring 1130 muscle-like actuators. For the right leg to achieve push-off, a second FMG (i.e., FMG2) might be activated, wherein FMG2 comprises the gluteus maximus 1125, the vasti 1115, the soleus 1145 and the gastrocnemius 1140 muscle-like actuators. To achieve lift-off, a third FMG (i.e., FMG3) might be activated, where FMG3 comprises the iliopsoas 1110 and the tibialis interior 1120 muscle-like actuators. Finally, to achieve positioning, a fourth FMG (i.e., FMG4) might be activated, wherein FMG4 comprises the vasti 1115, the tibialis interior 1120, and the rectus femoris 1105 muscle-like actuators. Referring back to FIG. 10, it is shown that rhythmic walking can then be achieved by simultaneously activating, in sequence, the following pairs of FMGs: FMG1–FMG5, FMG2–FMG6, FMG3–FMG7 and FMG4–FMG8, where FMG1, FMG2, FMG3 and FMG4 correspond with mobility events associated with the right leg, while FMG5, FMG6, FMG 7 and FMG8 correspond with mobility events associated with the left leg.

In the foregoing description, rhythmic walking is defined in terms of two mobility phases and several mobility events. However, one skilled in the art will readily appreciate the fact that rhythmic walking, or any other mobility pattern, may be defined in terms of mobility phases and mobility events which are different from those presented above.

TABLE 2

|  | STANCE PHASE | | SWING PHASE | |
| --- | --- | --- | --- | --- |
| Muscle-like Actuators | Gliding | Push-off | Life-off | Positioning |
| Gluteus Maximus |  | X |  |  |
| Iliopsoas |  |  | X |  |
| Vastii | X | X |  | X |
| Soleus |  | X |  |  |
| Tibialis Anterior |  |  | X | X |
| Biceps femoris |  |  |  |  |
| Hamstrings | X |  |  |  |
| Rectus femoris |  |  |  | X |
| Gastrocnemius |  | X |  |  |

Sensors

As indicated in FIG. 2, one or more sensors 240 are employed, in accordance with the preferred embodiment of the present invention. The one or more sensors 240 provide the controller 230 with important sensory feedback data which quantifies the state of the robot, such as the location and/or position of the robot, or one or more of the robots segments. The controller 230 uses the sensory feedback data to determine, for example, which FMG or FMGs to activate, when the FMG or FMGs are to be activated, and/or to what extend each muscle-like actuator is to be activated, assuming a "fuzzy if-then" rule-based algorithm is in use by the controller 230.

A first type of sensor that may be employed by the present invention is a "stretch" sensor. In general, stretch sensors comprise an elastic portion having electrical connections on either end. When the elastic portion is stretched, the electrical resistance of the sensor increases. When the elastic portion returns to its normal state, the electrical resistance likewise returns to a normal level. Attaching the stretch sensor such that it traverses the joint, the change in electrical resistance associated with the sensor may be used to quantify the angular displacement of the joint.

A second type of sensor that may be employed in the present invention is the accelerometer. Accelerometer, such as triaxial accelerometers, are capable of measuring the pitch, roll and yaw acceleration of a body to which the accelerometer is attached. Angular measurements in pitch, roll and yaw can then be obtained by integrating the acceleration measurements.

A third type of sensor that may be employed is a force sensor, such as a force sensitive resistor. Force sensitive resistors exhibit a decrease in electrical resistance when the level of pressure being applied to the surface of the sensor increases. Force sensitive resistors might be used on the hands of a robot to measure touch. Such sensors might also be used on the bottom of the robot's feet to determine when the feet are in contact with the ground. This would be of particular use in determining when to activate the appropriate FMGs during rhythmic walking.

Controller

As shown in FIG. 2, the sensory feedback loop 250 includes a controller 230. The controller 230 receives sensory feedback information from the one or more sensors 240 and, based on this information, the controller 230 generates control signals which activate the appropriate FMG or FMGs to accomplish a desired mobility task (e.g., walking, running, bending, grasping). In general,, the controller 230 accomplishes this by executing a control algorithm which is based on the principles of logic rather than complex mathematical models.

There are several advantages that are attributable to a control algorithm that is based on logic rather than complex mathematical models. One advantage is that the control algorithm is less complex. Thus, a robot employing a logic-based mobility control algorithm is more easily adaptable for use in a variety of application areas, such as, toy applications, entertainment applications, software applications, general robotics, education applications, research applications, domestic applications and medical applications. Another advantage is that the logic-based mobility control algorithm lends itself to the implementation of reinforcement learning, wherein the control algorithm itself is capable of improving its own performance based on past performance.

Figure 12:
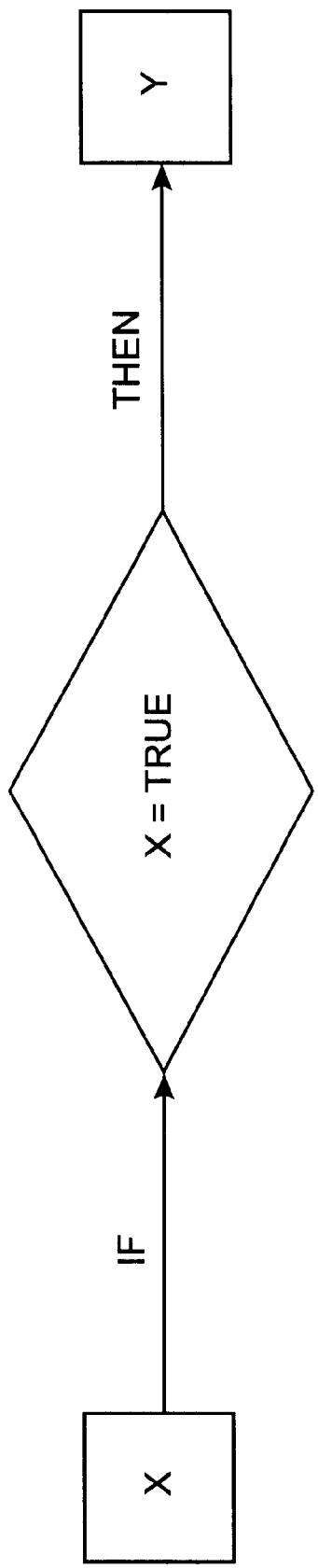
FIG. 12 illustrates the concept of discrete "if-then" rule-based logic.

In accordance with one exemplary embodiment of the present invention, the logical control algorithm associated with controller 230 is based on discrete "if-then" rules. FIG. 12 illustrates the concept behind discrete "if-then" rules. As shown, X represents a predefined condition. In contrast, Y represents a behavior or response which is invoked by the logical control algorithm if and only if the condition defined by X is true.

Figure 13:
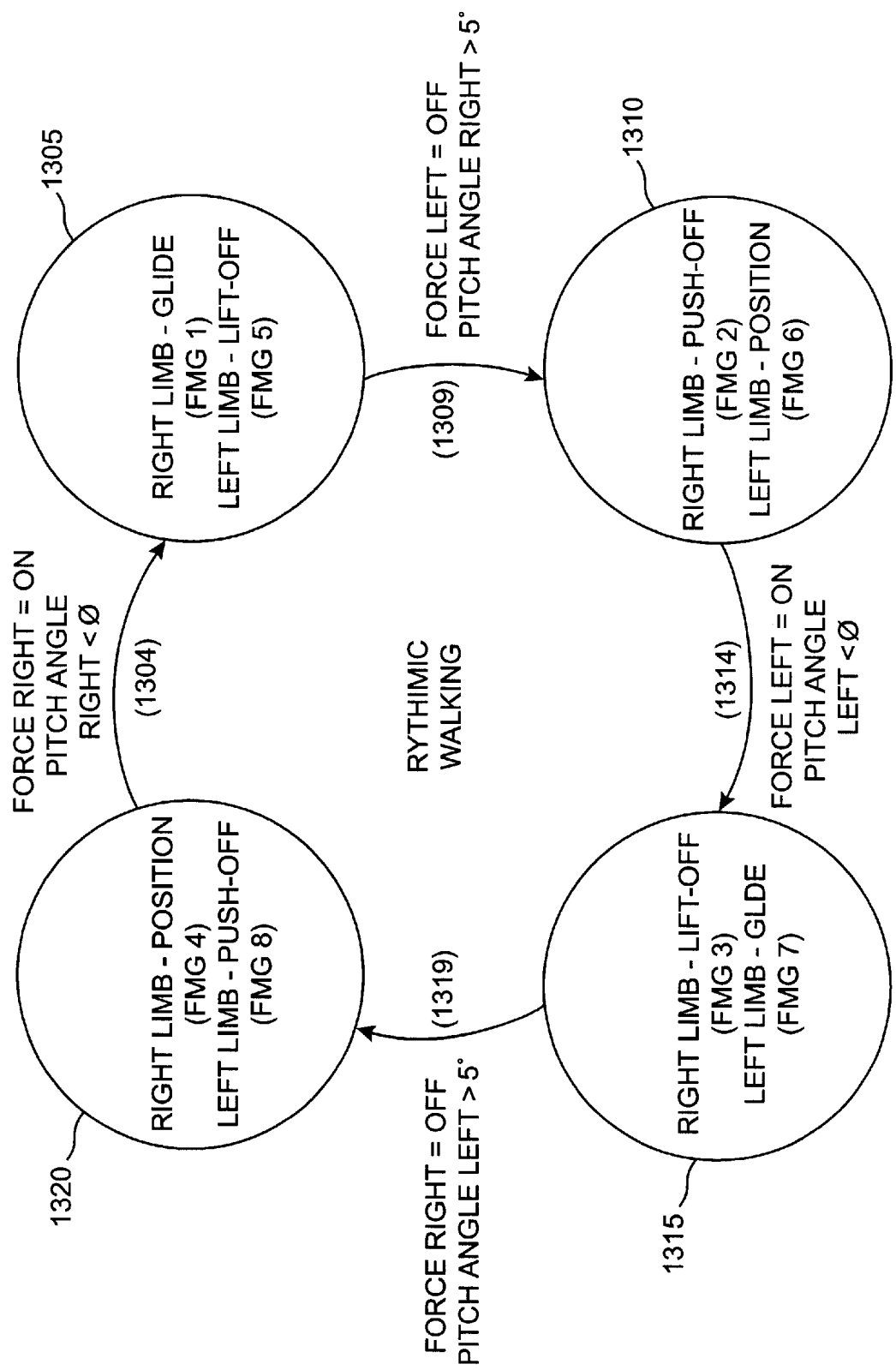
FIG. 13 illustrates the use of discrete "if-then" rules with respect to rhythmic walking.

FIG. 13 illustrates the use of discrete "if-then" rules with respect to rhythmic walking. As shown, rhythmic walking involves four events (i.e., behaviors) 1305, 1310, 1315 and 1320, where the events, in essence, represent the "then" part of the discrete "if-then" rule. Each of the four events 1305, 1310, 1315 and 1320 is invoked by the logical control algorithm based upon whether one of four corresponding, mutually exclusive conditions 1304, 1309, 1314 and 1319 is true. The conditions, in essence, represent the "if" part of the "if-then" rule.

For example, IF the logical control algorithm determines, based on sensory feedback data, that the robot's left limb is not in contact with the ground and the robot's right limb is behind a vertical plane passing through the body of a robot by an amount that is greater than 5 degrees (i.e., condition 1309 is true), THEN the logical control algorithm invokes event 1310. In doing so, the logical control algorithm activates FMG2 and FMG6, as shown in FIG. 13, which causes the right limb to begin pushing-off and the left limb to begin positioning itself to make contact with the ground, respectively.

IF, after invoking event 1310, the logical control algorithm determines, based on sensory feedback data, that the robot's left limb is in contact with the ground and that the left limb is in front of the imaginary vertical plane passing through the body of the robot (i.e., condition 1314 is true), THEN the logical control algorithm invokes event 1315. In so doing, the logical control algorithm activates FMG3 and FMG7, as indicated, which causes the right limb to begin lifting-off and the left limb to begin gliding, respectively.

IF, after invoking event 1315 the logical control algorithm determines, based on sensory feedback data, that the robot's right limb is no longer in contact with the ground and that the left limb is behind the imaginary vertical plane by an amount greater than 5 degrees (i.e., condition 1319 is true), THEN the logical control algorithm invokes event 1320.

Accordingly, the logical control algorithm activates FMG4 and FMG8, as shown, which causes the right limb to begin preparing to make contact with the ground and the left limb to begin pushing-off.

IF, after invoking event 1320, the logical control algorithm determines, based on the sensory feedback data, that the right limb is in contact with the ground and that the right limb is in front of the imagery vertical plane passing through the body of the robot (i.e., condition 1304 is true), THEN the logical control algorithm invokes event 1305. Thus, the logical control algorithm activates FMG1 and FMG5, as shown, which causes the right limb to begin gliding and the left limb to begin lifting-off.

In accordance with another exemplary embodiment of the present invention, the logical control algorithm associated with controller 230 is based on "fuzzy if-then" rules. As such, the "if" and/or "then" portions of the "if-then" rules are no longer discrete. That is, the condition associated with the "if" portion of the rule, and the response associated with the "then" portion of the rule, may take on a number of different values other than ON versus OFF, TRUE versus FALSE, or the like. Although the "fuzzy if-then" rule-based control algorithm tends to be more complex than the aforementioned discrete "if-then" rule-based algorithm, the "fuzzy if-then" rule-based algorithm has the potential to provide a greater level of stability and control.

Figure 14:
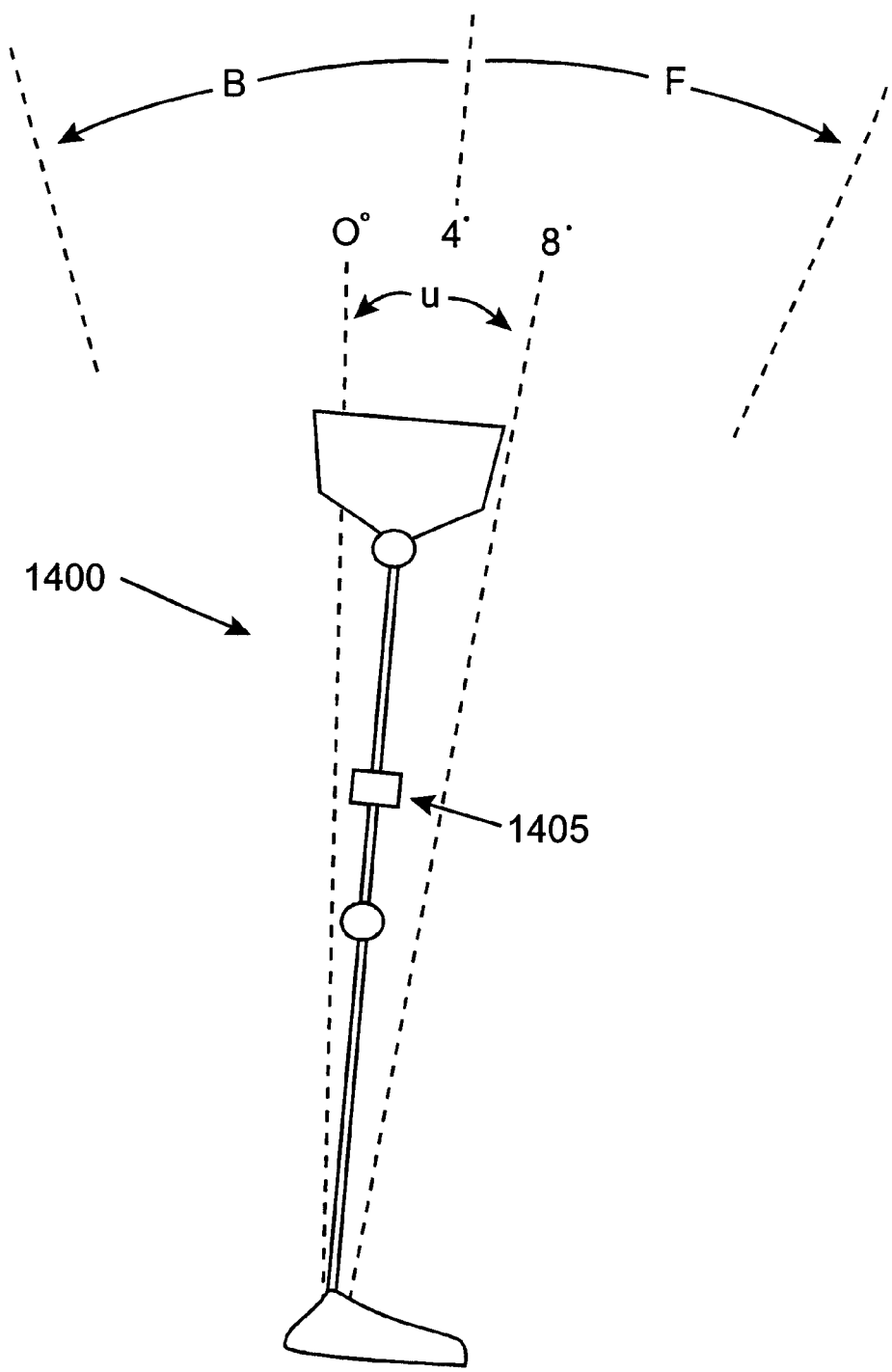
FIG. 14 illustrates a lateral view of a bipedal robot.
Figure 15A:
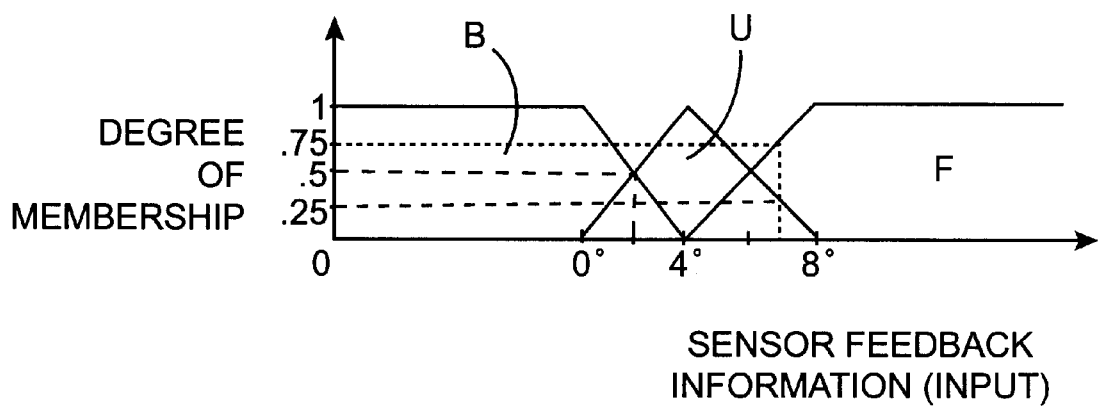
FIGS. 15A–B illustrate the use of "fuzzy if-then" rules with respect to standing and balancing.
Figure 15B:
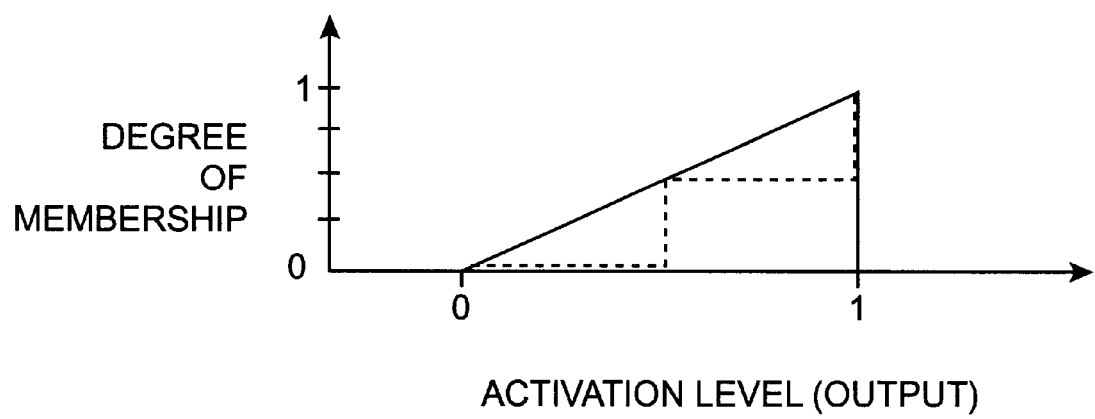

FIGS. 14 and 15A–B illustrate the concept of "fuzzy if-then" logic by example, wherein the "fuzzy if-then" rule-based control algorithm is used by controller 230 to achieve the task of standing and balancing. FIG. 14, more specifically, illustrates a lateral view of a bipedal robot 1400. Attached to the upper portion of the robot's leg is a tilt sensor 1405, wherein the tilt sensor 1405 is capable of providing the "fuzzy if-then" rule-based control algorithm with sensory feedback data relating to the pitch angle of the robot 1400.

As indicated in FIGS. 14 and 15A, the pitch angle of robot 1400 may be characterized by one of three, or two of three different sensory feedback, "fuzzy" input labels: Backward (B), Upright (U), and/or Forward (F). The sensory feedback, "fuzzy" input label B corresponds to a pitch angle of less than 4 degrees. The sensory feedback, "fuzzy" input label U corresponds to a pitch angle of between 0 and 8 degrees, inclusive. The sensory feedback, "fuzzy" input label F corresponds to a pitch angle of greater than 8 degrees. Consequently, a "fuzzy" input or "if" condition exists where the pitch angle of the robot 1400 is between 0 and 4 degrees, as the sensory feedback input labels B and U are overlapping. Likewise, a "fuzzy" input or "if" condition exists where the pitch angle of the robot 1400 is between 4 and 8 degrees, as the sensory feedback input labels U and F are overlapping.

In this example, it is assumed that there are three FMGs associated with the task of standing and balancing: FMG1, FMG2 and FMG3. For instance, FMG1 may be associated with the sensory feedback, "fuzzy" input label B, in that the control algorithm activates FMG1 whenever the sensory feedback data indicates that the pitch angle is less than 4 degrees. As such, FMG1 might include the following muscle-like actuators: hip extensor, knee extensor, dorsal flexor, and rectus femoris. Similarly, FMG3 may be associated with the sensory feedback, "fuzzy" input label F, in that the control algorithm activates FMG3 whenever the sensory feedback data indicates that the pitch angle is greater than 8 degrees. FMG3 might include the following muscle-like actuators: hip extensor, knee extensor, and hamstring.

FMG2 may then be associated with the sensory feedback, "fuzzy" input label U, in that the control algorithm activates FMG2 whenever the sensory feedback data indicates that the pitch angle is between 0 and 8 degrees, inclusive. FMG2 might include: hip extensor, knee extensor, and dorsal flexor.

Given the above-identified relationship between the three FMGs and the three sensory feedback input labels, the following "fuzzy" logic rules may be formulated:

1) IF the pitch angle is backward, THEN FMG1 is ON;
2) IF the pitch angle is Upright, THEN FMG2 is ON; and
3) IF the pitch angle is Forward, THEN FMG3 is ON;

where it should be readily apparent that one or two of the FMGs may be activated (i.e., ON) simultaneously, depending on the value of the pitch angle. Hence, the response or "then" portion of the "if-then" rule is "fuzzy". The question remains, however, to what degree is each FMG activated, particularly where more than one FMG is activated at a given instant in time.

FIGS. 15A–B illustrate how the "fuzzy if-then" rule-based control algorithm might determine to what degree each of the FMGs are to be activated. For instance, FIG. 15A shows the relationship between the sensor feedback data (i.e., the pitch angle of the robot 1400 shown along the horizontal axis), which serves as the input to the logical control algorithm, and the sensor feedback input labels B, U and F. Of particular importance, however, is that FIG. 15A also shows the degree of membership (along the vertical axis), that is, the degree to which each FMG is to be activated relative to the other FMGs, given a particular pitch angle. For example, if the sensor data provided by tilt sensor 1405 indicates that the pitch angle of the robot 1400 is approximately 2 degrees, the dashed-line in FIG. 15A indicates that the FMG associated with the sensory feedback input label B (i.e., FMG1) has a degree of membership of 0.5 and the FMG associated with the sensory feedback input label U (i.e., FMG2) also has a degree of membership of 0.5. If, in contrast, the sensor data provided by tilt sensor 1405 indicates that the pitch angle of the robot 1400 is approximately 7 degrees, the dotted-lines in FIG. 15A indicate that the FMG associated with the sensory feedback input label U (i.e., FMG2) has a degree of membership of 0.25, while the FMG associated with the sensory feedback input label F (i.e., FMG3) has a degree of membership of 0.75.

FIG. 15B, in contrast, illustrates the relationship between the degree of membership associated with each FMG (along the vertical axis) and the actual level of activation (e.g., the amount of air pressure, electrical current, or chemical reactant that is to be supplied to the muscle-like actuators associated with each FMG). Although the relationship between the degree of membership and the activation level is illustrated as being continuous and linear, it will be understood that the relationship may be, continuous and non-linear, as well as non-continuous (i.e., discrete). For example, if the degree of membership for a FMG is greater than zero, but less than or equal to 0.5, the level of activation may be set at 50 percent, as illustrated by the dashed-line in FIG. 15B, regardless whether the degree of membership is 0.5 or less than 0.5. Similarly, if the degree of membership for a FMG is greater than 0.5, but less than or equal to 1.0, the level of activation may be set at 100 percent.

Where the control algorithm employs discrete "if-then" logic, as described above, one skilled in the art will readily appreciate that only one FMG is activated (i.e., ON) at a given instant in time. However, where the control algorithm employs "fuzzy if-then" logic, one skilled in the art will understand from the preceding discussion that more than one FMG may be activated at a given instant in time, and as a result, the logical control algorithm can provide a gradual transition from one FMG to another as the status of the robot changes according to the sensory feedback data.

The present invention has now been described in accordance with several exemplary embodiments, which are intended to be illustrative in all aspects, rather than restrictive. Thus, the present invention is capable of many variations in detailed implementation, which may be derived from the description contained herein by a person or ordinary skill in the art. All such variations are considered to be within the scope and spirit of the present invention as defined by the following claims.

What is claimed is:

1. A robot comprising:

a first anatomical segment;

a second anatomical segment;

a joint attached to said first anatomical segment, wherein said first anatomical segment moves relative to said second anatomical segment as a function of an amount of rotation associated with said joint; and a muscle-like actuator having a first end fixed to a position along said first anatomical segment and a second end fixed to a position along said second anatomical segment, and said muscle-like actuator having a predefined control operating range, such that when said muscle-like actuator is activated it undergoes a predefined change in length, and said joint rotates by a corresponding, predefined amount that is a function of the predefined change in length and the positions along said first and second anatomical segments to which the first and second ends of said muscle-like actuator are fixed;

wherein said muscle-like actuator comprises a contractile portion adapted to be activated by inflating the contractible portion with pressurized air, by exposing the contractile portion to electric current or by applying a chemical reactant to the contractile portion.

2. The robot of claim 1, wherein said muscle-like actuator is a monoarticular muscle-like actuator.

3. The robot of claim 2, wherein said joint is attached to said second anatomical segment.

4. The robot of claim 2, wherein the predefined amount of rotation associated with the joint is a function of a moment arm, the moment arm representing a perpendicular distance from said muscle-like actuator to a joint axis associated with said joint.

5. The robot of claim 2 further comprising:

a second muscle-like actuator having a first end fixed to a position along said first anatomical segment and a second end fixed to a position along said second anatomical segment, wherein said second muscle-like actuator has a predefined control operating range, such that when said second muscle-like actuator is activated said joint rotates by a corresponding, predefined amount that differs from the amount said joint would rotate if said first muscle-like actuator is activated and said second muscle-like actuator is deactivated.

6. The robot of claim 1, wherein said muscle-like actuator is a biarticular muscle-like actuator.

7. The robot of claim 6 further comprising:

a third anatomical segment; and a second joint, wherein said third anatomical segment is attached to said first joint and said second joint, and wherein said second anatomical segment is attached to said second joint.

8. The robot of claim 7 further comprising:
a second biarticular muscle-like actuator having a first end fixed to a position along said first anatomical segment and a second end fixed to a position along said second anatomical segment, wherein said second biarticular muscle-like actuator has a predefined control operating range, such that when said second. biarticular muscle-like actuator is activated said joints., traversed by said first and second biarticular muscle-like actuators, rotate by an amount that differs from the amount said joints would rotate if said first biarticular muscle-like actuator is activated and said second biarticular muscle-like actuator is deactivated.

9. The robot of claim 6, wherein said second joint rotates by a second corresponding, predefined amount that is a function of the predefined change in length of said muscle-like actuator and the positions along said first and second anatomical segments to which the first and second ends of said muscle-like actuator are fixed.

10. The robot of claim 9, wherein the predefined amount of rotation associated with said joint is a function of a first moment arm, wherein the first moment arm represents a perpendicular distance from said muscle-like actuator to a joint axis associated with said joint.

11. The robot of claim 9, wherein the predefined amount of rotation associated with said second joint is a function of a second moment arm, wherein the second moment arm represents a perpendicular distance from said muscle-like actuator to a joint axis associated with said second joint.

12. The robot of claim 1, wherein said muscle like actuator further comprises:
a non-contractile portion, said non-contractile portion having a first end and a second end, wherein the first end of the non-contractile portion is attached to a first end of the contractile portion and the second end of the non-contractile portion is attached to the position along said first anatomical segment.

13. The robot of claim 12, wherein said muscle-like actuator further comprises:
a second non-contractile portion, said second non-contractile portion having a first end and a second end, wherein the first end of the second non-contractile portion is attached to a second end of the contractile portion and the second end of the second non-contractile portion is attached to the position along said second anatomical segment.

14. The robot of claim 1, wherein said muscle-like actuator is activated by inflating the contractile portion with pressurized air.

15. The robot of claim 1, wherein said muscle-like actuator is activated by exposing the contractile portion to electric current.

16. The robot of claim 1, wherein said muscle-like actuator is activated by applying a chemical reactant to the contractile portion.

17. A multi-segmented robot comprising:
a plurality of anatomical segments;
a plurality of joints, wherein each of said plurality of joints couples two adjacent anatomical segments such that the two adjacent anatomical segments move relative to each other as a function of an amount of rotation associated with the joint;
a plurality of muscle-like actuators, each comprising a first end fixed to a position along one of said plurality of anatomical segments and a second end fixed to a position along a second one of said plurality of anatomical segments, wherein activation of a muscle-like actuator causes torque to be applied to at least one of said plurality of joints thereby causing two or more of said anatomical segments to move relative to each other; and
a controller, coupled to each of said plurality of muscle-like actuators, comprising means for defining each of a plurality of states, wherein each of the plurality of states corresponds with a different functional grouping of muscle-like actuators, and wherein for a given state, the muscle-like actuators associated with the corresponding functional grouping are defined as being activated and the muscle-like actuators that are not associated with the functional grouping are defined as being deactived.

18. The multi-segmented robot of claim 17, wherein the functional grouping of muscle-like actuators associated with a given state corresponds with a desired mobility event.

19. The multi-segmented robot of claim 18, wherein the desired mobility event corresponds with a desired positioning of said plurality of anatomical segments.

20. The multi-segmented robot of claim 18, wherein said FMG comprises a combination of muscle-like actuators capable of providing the control needed to accomplish the mobility event.

21. The multi-segmented robot of claim 20, wherein the combination of muscle-like actuators minimizes energy losses during the mobility event.

22. The multi-segmented robot of claim 21, wherein the combination of muscle-like actuators includes only monoarticular muscle-like actuators.

23. The multi-segmented robot of claim 21, wherein the combination of muscle-like actuators includes only biarticular muscle-like actuators.

24. The multi-segmented robot of claim 21, wherein the combination of muscle-like actuators includes monoarticular and biarticular antagonist muscle-like actuators.

25. The multi-segmented robot of claim 17, wherein each muscle-like actuator associated with a functional muscle grouping is further associated with a level of activation selected from a set of levels that includes at least one intermediated level, and wherein the level of activation associated with each muscle-like actuator belonging to the functional muscle grouping defines a desired mobility event, wherein the desired mobility event corresponds with a desired positioning of said plurality of anatomical segments.

26. The multi-segmented robot of claim 17, wherein said plurality of muscle-like actuators and joints are configured such that they provide mechanical feedback which opposes undesired movements of said plurality of anatomical segments.

27. The multi-segmented robot of claim 17, further comprising:
one or more sensors, wherein each of said one or more sensors provides a respective sensor feedback signal to said controller which indicates a position of one or more of said plurality of anatomical sensors.

28. The multi-segmented robot of claim 17, wherein a change in the signal associated with the one or more sensors causes the controller to transition from a present state to a next state.

29. The multi-segmented robot of claim 17, wherein mobility is achieved through a sequence of controller states, each associated with activating a corresponding functional muscle grouping.

30. A biologically-inspired, multi-segmented robot comprising:

a plurality of anatomical segments;

a plurality of joints, wherein each of said plurality of joints couples two adjacent anatomical segments;

a plurality of muscle-like actuators, wherein each of said muscle-like actuators includes a first and a second end, wherein the first end of each muscle-like actuator is attached to one of said plurality of anatomical segments, wherein the second end of each muscle-like actuator is attached to a second one of said plurality of anatomical segments, and wherein said plurality of muscle-like actuators and joints are configured so as to provide mechanical feedback for said muscle-like actuators;

a controller for activating one or more functional groupings of said muscle-like actuators to achieve a desired mobility event; and one or more sensors coupled to said controller and said anatomical segments, said sensors providing feedback data to said controller, wherein feedback data defines a position associated with one or more of said anatomical segments.

31. The biologically-inspired, multi-segmented robot of claim 30, wherein each of said muscle-like actuators comprises:

a contractile portion.

32. The biologically-inspired, multi-segmented robot of claim 32, wherein said plurality of muscle-like actuators include at least one monoarticular muscle-like actuator.

33. The biologically-inspired, multi-segmented robot of claim 32, wherein said plurality of muscle-like actuators include at least one biarticular muscle-like actuator.

34. The biologically-inspired, multi-segmented robot of claim 30, wherein the mechanical feedback provides means for opposing undesirable movements associated with said plurality of anatomical segments.

35. The biologically-inspired, multi-segmented robot of claim 30, wherein said controller comprises:

a logic-based mobility control algorithm.

36. The biologically-inspired, multi-segmented robot of claim 35, wherein the logic-based mobility control algorithm employs discrete "if-then" rule-based logic.

37. The biologically-inspired, multi-segmented robot of claim 36, wherein the logic-based mobility control algorithm comprises:

means for receiving feedback data from said one or more sensors;

means for activating one functional grouping of muscle-like actuators at a given instant of time to achieve a desired mobility event based on the feedback data.

38. The biologically-inspired, multi-segmented robot of claim 35, wherein the logic-based mobility control algorithm employs "fuzzy if-then" rule-based logic.

39. The biologically-inspired, multi-segmented robot of claim 38, wherein logic-based mobility control algorithm comprises:

means for receiving feedback data from said one or more sensors;

means for activating a functional grouping of said muscle-like actuators, to achieve a desired mobility event, in accordance with a level of activation selected from a set of levels that includes at least one intermediate level of activation.

40. The biologically-inspired, multi-segmented robot of claim 39, wherein the logic-based mobility control algorithm further comprises:

means for activating a second functional grouping of muscle-like actuators during said given instant of time, to achieve the desired mobility event based on the feedback data, wherein the activation of the second functional grouping of muscle-like actuators is accomplished in accordance with a level of activation selected from a set of levels that includes at least one intermediate level of activation.

41. A method for controlling mobility in a biologically-inspired, multi-joint, multi-segmented robot comprising the steps of:

activating a first functional grouping of muscle-like actuators, which causes a repositioning of one or more of the multiple segments associated with said robot, so as to achieve a first mobility event;

measuring a status of said robot; [@00de]termining whether the first mobility event has been achieved based on the results of said step of measuring the status of said robot; and if it is determined that said first mobility event has been achieved based on the results of said step of measuring the status of said robot, activating a second functional muscle grouping of muscle-like actuators, which cause a further repositioning of one or more of the multiple segments associated with said robot, so as to achieve a second mobility event.

42. The method of claim 41, wherein said step of activating the first functional grouping of muscle-like actuators comprises the step of:

generating one or more control signals which activate each of the muscle-like actuators associated with the first functional grouping of muscle-like actuators.

43. The method of claim 42, wherein the generation of said control signals causes each of the muscle-like actuators associated with the first functional grouping of muscle-like actuators to fully contract.

44. The method of claim 41, wherein said step of measuring the status of said robot comprises the step of:

quantifying a position associated with one or more of the multiple segments.

45. The method of claim 41, wherein said step of measuring the status of said robot comprises the step of:

quantifying a force acting upon one or more of the multiple segments.

46. The method of claim 41, wherein said step of measuring the status of said robot comprises the step of:

quantifying a position associated with said robot relative to a foreign object.

47. The method of claim 41, wherein said step of determining whether the first mobility event has been achieved comprises the step of:

determining whether a predefined condition indicating the completion of the mobility event is satisfied.

48. The method of claim 41, wherein an activation period associated with the first functional grouping of muscle-like actuators and an activation period associated with the second functional grouping of muscle-like actuators are mutually exclusive.

49. A method for controlling mobility in a biologically-inspired, multi-joint, multi-segmented robot comprising the steps of:

quantifying a state of said robot;

activating a first functional grouping of muscle-like actuators, to achieve activating a first functional grouping of muscle-like actuators, to achieve a first desired mobility event, in accordance with a level of activation selected from a set of activation levels which includes at least one intermediate activation level, said first functional grouping of muscle-like actuators comprising a subset of all muscle-like actuators associated with said robot; and actuating one or more segments associated with said robot as a function of said step of activating the first functional grouping of muscle-like actuators.

50. The method of claim 49 further comprising the step of:

activating a second functional grouping of muscle-like actuators, to achieve the first desired mobility event, in accordance with a level of activation selected from a set of activation levels which includes at least one intermediate activation level, said second functional grouping of muscle-like actuators comprising a second subset of all the muscle-like actuators associated with said robot.

51. The method of claim 50, wherein said step of activating the first functional grouping of muscle-like actuators and the step of activating the second functional grouping of muscle-like actuators each comprise the step of:

generating one or more control signals which activate the muscle-like actuators associated with the first functional grouping of muscle-like actuators and the muscle-like actuators associated with second functional grouping of muscle-like actuators.

52. The method of claim 49, wherein said step of quantifying the state of said robot comprises the step of:

quantifying a position associated with one or more of the multiple segments.

53. The method of claim 49, wherein said step of quantifying the state of said robot comprises the step of:

quantifying a force acting upon one or more of the multiple segments.

54. The method of claim 49, wherein said step of quantifying the state of said robot comprises the step of: quantifying a position associated with said robot relative to a foreign object.

* * * * *